(12) United States Patent
Hu

(10) Patent No.: US 8,254,922 B2
(45) Date of Patent: Aug. 28, 2012

(54) ZERO DELAY FREQUENCY SWITCHING WITH DYNAMIC FREQUENCY HOPPING FOR COGNITIVE RADIO BASED DYNAMIC SPECTRUM ACCESS NETWORK SYSTEMS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1043 days.

(21) Appl. No.: 11/549,912

(22) Filed: Oct. 16, 2006

(65) Prior Publication Data

US 2008/0089389 A1 Apr. 17, 2008

(51) Int. Cl.
*H04W 4/00* (2009.01)
*H04B 1/00* (2006.01)

(52) U.S. Cl. .................. 455/434; 375/132; 375/134

(58) Field of Classification Search .......... 375/132, 375/267, 134, 240.02; 455/454, 522, 62, 455/452.1, 434, 435.1, 75, 418; 370/329, 370/319, 241, 455, 235, 444, 230
See application file for complete search history.

(56) References Cited

U.S. PATENT DOCUMENTS

| | | | |
|---|---|---|---|
| 5,191,578 A | 3/1993 | Lee | |
| 5,394,433 A | 2/1995 | Bantz et al. | |
| 5,574,979 A * | 11/1996 | West | 455/63.1 |
| 5,627,880 A * | 5/1997 | Rozanski et al. | 370/335 |
| 5,862,142 A | 1/1999 | Takiyasu et al. | |
| 6,788,702 B1 | 9/2004 | Garcia-Luna-Aceves et al. | |
| 6,882,851 B2 | 4/2005 | Sugar et al. | |
| 7,197,025 B2 | 3/2007 | Chuah | |
| 7,289,542 B2 * | 10/2007 | Schmandt | 370/516 |
| 7,423,966 B2 | 9/2008 | Xu | |
| 7,496,081 B2 | 2/2009 | Salokannel et al. | |
| 7,505,761 B2 | 3/2009 | Ikeda | |
| 7,742,764 B2 | 6/2010 | Gillig et al. | |
| 7,756,058 B2 | 7/2010 | Cordeiro et al. | |
| 7,801,077 B2 | 9/2010 | Rentel et al. | |
| 7,801,526 B2 | 9/2010 | Newberg et al. | |
| 7,826,422 B2 | 11/2010 | Chu et al. | |
| 7,860,500 B2 | 12/2010 | Buchwald et al. | |
| 7,937,045 B2 | 5/2011 | Lekselius | |
| 2002/0176364 A1 | 11/2002 | Nakamura et al. | |
| 2003/0224787 A1 | 12/2003 | Gandolfo | |
| 2004/0028003 A1 | 2/2004 | Diener et al. | |
| 2004/0090979 A1 | 5/2004 | Xu | |

(Continued)

FOREIGN PATENT DOCUMENTS

EP 1850543 A2 10/2007

(Continued)

OTHER PUBLICATIONS

IEEE P802.22 Wireless RANs, IEEE 802.22 Wireless RAN Standard PHY and MAC Proposal, XP-007902731, Nov. 2005, pp. 1-53.

(Continued)

*Primary Examiner* — Kiet Doan
(74) *Attorney, Agent, or Firm* — Hogan Lovells US LLP

(57) ABSTRACT

This invention relates to cognitive radio based wireless communications of dynamic spectrum access networks, and in particular to a method of addressing zero-delay frequency switching for cognitive dynamic frequency hopping. The method combines regular (periodic) channel maintenance with dynamic frequency hopping over a cluster of vacated channels that are initially setup such that the switching delays for channel setup and channel availability check are eliminated.

29 Claims, 13 Drawing Sheets

EXAMPLE OF ZERO OVERHEAD COGNITIVE (DYNAMIC) FREQUENCY HOPPING

U.S. PATENT DOCUMENTS

| | | |
|---|---|---|
| 2004/0166838 A1 | 8/2004 | Backes et al. |
| 2006/0225089 A1 | 10/2006 | Ikeda |
| 2006/0239220 A1 | 10/2006 | Celentano et al. |
| 2006/0245448 A1 | 11/2006 | Chan et al. |
| 2007/0091998 A1* | 4/2007 | Woo et al. ............... 375/240.02 |
| 2007/0165586 A1 | 7/2007 | Taylor et al. |
| 2007/0258404 A1 | 11/2007 | Tirkkonen et al. |
| 2007/0274206 A1 | 11/2007 | Habetha et al. |
| 2008/0009305 A1 | 1/2008 | Li et al. |
| 2008/0014861 A1 | 1/2008 | Li et al. |
| 2008/0101264 A1 | 5/2008 | Li et al. |
| 2008/0101447 A1 | 5/2008 | Li et al. |
| 2008/0159258 A1 | 7/2008 | Ji et al. |
| 2008/0267148 A1 | 10/2008 | Speight |
| 2008/0317062 A1 | 12/2008 | Timmers et al. |
| 2009/0067354 A1 | 3/2009 | Gao et al. |
| 2009/0096660 A1 | 4/2009 | Lekselius |
| 2009/0180453 A1 | 7/2009 | Hu |
| 2009/0180492 A1 | 7/2009 | Hu |
| 2009/0258603 A1 | 10/2009 | Ghaboosi et al. |
| 2009/0274140 A1 | 11/2009 | Cordeiro et al. |
| 2009/0274195 A1 | 11/2009 | Chang |
| 2009/0323697 A1 | 12/2009 | Celentano et al. |
| 2010/0009692 A1 | 1/2010 | Shan et al. |
| 2010/0020732 A1 | 1/2010 | Gaddam et al. |
| 2010/0034143 A1 | 2/2010 | Cordeiro et al. |
| 2010/0091711 A1 | 4/2010 | Sawai |
| 2010/0232310 A1 | 9/2010 | Hu |
| 2010/0232358 A1 | 9/2010 | Hu |
| 2010/0232359 A1 | 9/2010 | Hu |
| 2010/0232360 A1 | 9/2010 | Hu |
| 2010/0232361 A1 | 9/2010 | Hu |
| 2010/0232381 A1 | 9/2010 | Hu |
| 2010/0246434 A1 | 9/2010 | Wang et al. |
| 2010/0260085 A1 | 10/2010 | Wang et al. |
| 2010/0271948 A1 | 10/2010 | Challapali et al. |
| 2010/0296404 A1 | 11/2010 | Quadri et al. |
| 2010/0304772 A1 | 12/2010 | Wang et al. |
| 2011/0032912 A1 | 2/2011 | Cordeiro et al. |
| 2011/0090887 A1 | 4/2011 | Kim et al. |

FOREIGN PATENT DOCUMENTS

| | | |
|---|---|---|
| GB | 2165726 A | 4/1986 |

OTHER PUBLICATIONS

Hu, Wendong et al., Efficient, Flexible, and Scalable Inter-Network Spectrum Sharing and Communications in Cognitive IEEE 802.22 Networks, STMicroelectronics Inc. & University of California, Los Angeles, pp. 5.

Hu, Wendong et al., Beaconing Period Framing for Efficient Multi-Channel Inter-Cell Communications in Cognitive Radio Networks, Jan. 7, 2008, pp. 9.

* cited by examiner

A BASELINE NON-OVERLAP RF SENSING SCHEDULING SCHEME

RF SENSING ON SELECTIVE SPECTRUM OVERLAPPING WITH DATA TRANSMISSIONS

EXAMPLE OF ZERO OVERHEAD COGNITIVE (DYNAMIC) FREQUENCY HOPPING

COGNITIVE (DYNAMIC) FREQUENCY HOPPING COLLISION CAUSED BY HIDDEN NODES

CFH/CA ALGORITHM

DFS MESSAGING CONTROL MECHANISM

AN EXAMPLE CO-EXISTENCE SCENARIO OF 802.22 SYSTEMS

EXAMPLE OF ODSC

BRIDGE CPE AND CO-EXISTENCE CONNECTIONS

CO-EXISTENCE CONNECTIONS BETWEEN TWO BASE STATIONS

OVER-THE-BACKHAUL INTER-SYSTEM COMMUNICATIONS SCENARIO

CO-EXISTENCE MANAGEMENT ENTITY IN THE PROTOCOL STACK

ZERO DELAY FREQUENCY SWITCHING WITH DYNAMIC FREQUENCY HOPPING FOR COGNITIVE RADIO BASED DYNAMIC SPECTRUM ACCESS NETWORK SYSTEMS

RELATED APPLICATIONS

The present application relates to co-pending U.S. patent application Ser. No. 11/549,925, filed on even date herewith, entitled, "METHODS OF RF SENSING CONTROL AND DYNAMIC FREQUENCY SELECTION CONTROL FOR COGNITIVE RAD10 BASED DYNAMIC SPECTRUM ACCESS NETWORK SYSTEMS-COGNITIVE DYNAMIC FREQUENCY HOPPING"; co-pending U.S. patent application Ser. No. 11/549,895, filed on even date herewith, entitled, "METHODS OF MESSAGING CONTROL OF DYNAMIC FREQUENCY SELECTION (DFS) FOR COGNITIVE RAD10 BASED DYNAMIC SPECTRUM ACCESS NETWORK SYSTEMS"; co-pending U.S. patent application Ser. No. 11/549,890, filed on even date herewith, entitled, "METHOD OF INTER-SYSTEM COEXISTENCE AND SPECTRUM SHARING FOR DYNAMIC SPECTRUM ACCESS NETWORKS-ON-DEMAND SPECTRUM CONTENTION"; and co-pending U.S. patent application Ser. No. 11/549,906, filed on even date herewith, entitled, "METHOD OF INTER-SYSTEM COMMUNICATIONS DYNAMIC SPECTRUM ACCESS NETWORK SYSTEMS—LOGICAL CONTROL CONNECTIONS". These applications are incorporated herein by reference in entirety.

BACKGROUND OF THE INVENTION

This invention relates to cognitive radio based wireless communications of dynamic spectrum access networks, and in particular to a method of addressing zero-delay frequency switching for cognitive dynamic frequency hopping.

RF Spectrum scarcity, caused by costly spectrum access, becomes a major issue for deploying future wireless communication systems, according to the current spectrum allocation of regulatory organizations world wide. On the other hand, spectrum utilization measurements indicate that frequencies allocated in the licensed band are largely under-utilized. For example, measurement shows that only 5.2% of spectrum is in use in the US for the frequency bands below 3 GHz. Scarcity of spectrum licensing and under-utilization of licensed band motivate dynamic spectrum access that allows un-licensed wireless applications to operate in the licensed band while insuring no harmful interference to the incumbent users in the licensed band.

As an enabling technology for open spectrum access, cognitive radio is able to perform spectrum sensing, learning, and adapting to the RF environment so as to facilitate unlicensed radio operations and enhancement of spectrum reuse efficiency in intelligent ways. The key issues are RF spectrum sensing, learning, and adaptation, with objectives of guaranteeing incumbent service protection, and maintaining fair spectrum sharing and appropriate Quality-of-Service of cognitive radio systems.

The charter of IEEE 802.22, the Working Group on Wireless Regional Area Networks ("WRANs"), under the PAR approved by the IEEE-SA Standards Board is to develop a standard for a cognitive radio-based PHY/MAC/air-interface for use by license-exempt devices on a non-interfering basis in spectrum that is allocated to the TV Broadcast Service.

This invention provides Medium Access Control (MAC) methods for Cognitive Radio based dynamic access network systems, especially for IEEE 802.22 WRAN systems, addressing the key technical issues listed above.

SUMMARY OF THE INVENTION

This invention relates to cognitive radio based wireless communications of dynamic spectrum access networks, and in particular to a method of addressing zero-delay frequency switching for cognitive dynamic frequency hopping. The method of the present invention combines regular (periodic) channel maintenance with dynamic frequency hopping over a cluster of vacated channels that are initially setup such that the switching delays for channel setup and channel availability check are eliminated.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION

Cognitive Radio based Dynamic Spectrum Access Networks (DYSPAN), particularly IEEE 802.22 Wireless Regional Area Networks (WRAN) as an example, provide the protection of licensed incumbent services through functionalities such as RF spectrum sensing, dynamic frequency selection (DFS), and transmission power control (TPC).

RF sensing detects the channel occupancy of licensed incumbent services in the spectrum. DFS and TPC are mechanisms that dynamically adjust the transmission frequency and the transmission power respectively of a DYSPAN (WRAN) system so as to avoid harmful interference to licensed incumbent services.

The MAC layer of DYSPAN (WRAN) provides supports for RF spectrum sensing control, DFS control and TPC control in order to insure the protection of licensed incumbent services while maintaining satisfactory Quality of Services (QoS).

RF sensing is the essential operation for licensed incumbent services protection providing channel occupancy detection of licensed incumbent services. Reliable RF sensing, however, might impact the data transmission of a DYSPAN (WRAN) system due to the fact that RF sensing may require interferences caused by data transmissions of its own system to be below a certain threshold in order to guarantee reliable sensing performance.

Based on the above observations, the objectives of the RF sensing control scheme of the present invention are twofold: 1) RF sensing shall be performed reliably and in a timely manner in order to guarantee the protection of licensed incumbent services; and 2) The impact of RF sensing on data transmissions shall be limited to an acceptable level such that the QoS requirements of DYSPAN (WRAN) systems can be satisfied.

There are two basic control approaches in which RF sensing can be performed along with data transmission services: 1) Separated RF sensing and data transmission—RF sensing operations are performed in periodically scheduled quiet sensing periods, in which no data transmission service is allowed to be performed, and 2) Simultaneous RF sensing and data transmission—RF sensing and data transmissions are performed in parallel.

Figure 1:
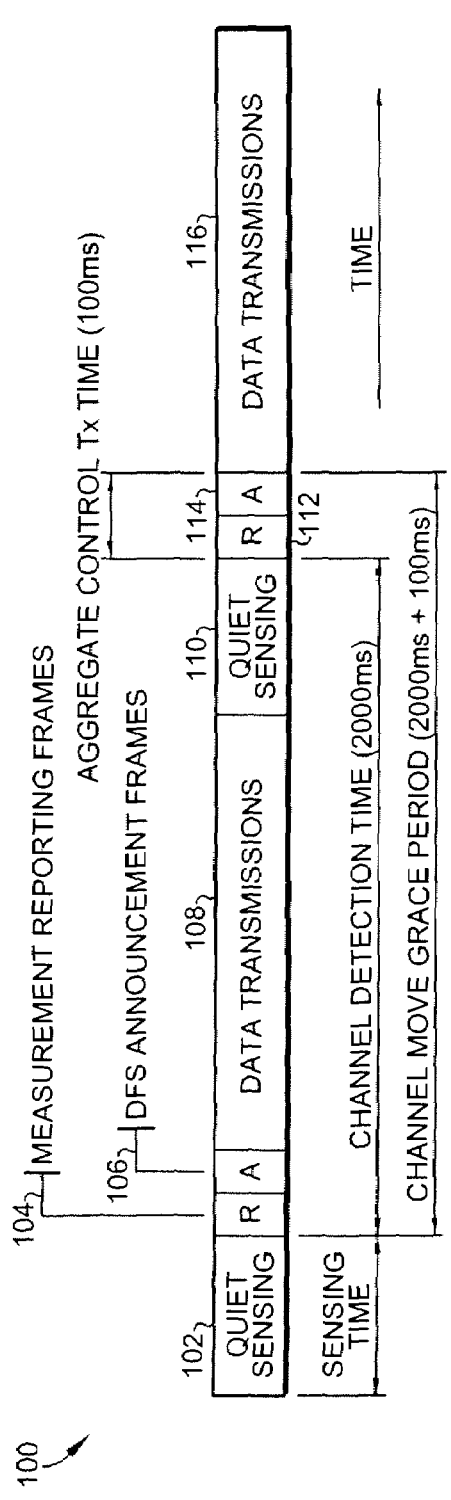
FIG. 1 is a baseline non-overlap RF sensing scheduling scheme.

In the first basic approach of RF sensing, every channel is sensed in periodically scheduled quiet sensing periods, in which no data transmission service is allowed to be performed. This solution option is referred to as a "non-overlap" solution. The non-overlap solution has the advantage of reliable sensing performance because data transmissions are ceased while sensing so that interference from a channel's own system is zeroed. This solution, however, has two major drawbacks: 1) service interruption and 2) potentially low system utilization. A baseline scheduling mode of the non-overlap solution 100 is shown in FIG. 1.

During a quiet sensing period 102 (110), data transmission services are ceased until the end of the sensing period 102 (110). The time of interruption is dictated by the sensing time which depends on both sensing technology and licensed incumbent services. The interruption time becomes a part of the data transmission latency. In the case wherein the interruption time (quiet sensing time) is larger than a certain threshold, QoS of DYSPAN (802.22 WRAN) systems can not be maintained in terms of the transmission latency. Note that the maximum latency requirements are 20 ms for both full quality telephony and time critical packet, and 40 ms for standard quality telephony.

Moreover, no data transmission service is provided by the system during a quiet sensing period 102. The system utilization for data transmission services, as shown in equation (1), is determined by the following factors: the quiet sensing time 102, the dynamic frequency selection (DFS) time 104 (112), 106 (114), 116 (DFS messaging time, DFS processing time, etc.), and the period (inverse of frequency) of the RF sensing 108.

$$U_{Data} = 1 - \frac{T_{sensing} + T_{DFS}}{T_{sensing\_period}};\quad(1)$$

In order to guarantee the licensed incumbent protection, the RF sensing period 108, $T_{senssing\_period}$, has to be less than or equal to the Channel Detection Time 108 that is constrained by the licensed incumbent services. The DFS time 104, 106, 114, 116, $T_{DFS}$, is a combination of the measurement reporting time, the report processing time, and the channel closing time. Therefore the DFS time 104, 106, 114, 116, depends on the efficiency of the DFS signaling algorithms and decision-making algorithms. The aggregated DFS signaling (control packets exchange for DFS) time 104, 106, 114, 116, after a maximum allowed channel detection time 108 shall not exceed 100 ms according to the requirement of incumbents in the IEEE 802.22 WRAN scenario. As mentioned before, the time for reliable RF sensing 102, $T_{sensing}$, is sensing technology dependent and incumbent services dependent.

Given a stringent channel detection time 108 (RF sensing period) imposed by licensed incumbent services and imperfect sensing time 102 and DFS time 104, 106, the system utilization for data transmission services could potentially be below a level that is required for the acceptable network throughput.

As for the second RF sensing control approach, Simultaneous Sensing and Data Transmissions (SSDT), two control solutions can be conceived. The first solution is to overlap data transmissions with RF sensing that monitors the full spectrum of channels including those that are in use for data transmissions. This option is referred to as the "Full-SSDT" solution. Similarly, in the second option data transmissions are overlapped with RF sensing, however, only those channels for which reliable sensing can be achieved are monitored. This option is referred to as the "Selective-SSDT" solution.

With the "Full-SSDT" option, the system resolves problems of service interruption and potential low system utilizations. Another advantage of applying the "Full-SSDT" option is that the system is also able to record accurate timing (on-line) information with regard to channel occupancy and vacancy of incumbent services so that more efficient spectrum utilization could be achieved. The major disadvantage of this solution, however, is the self-interference to the sensing antenna when the channels in use are being sensed. It is difficult to achieve reliable and timely RF sensing for guaranteeing incumbent protection unless sophisticated sensing technologies for self-interference mitigation are available, or reduced transmission power (which in turn affects efficiency/throughput) is feasible.

According to the present invention, a Selective-SSDT solution is used for RF sensing control, which can overcome the drawbacks of the above two solutions while maintaining their main advantages. As with the Full-SSDT solution, the method of the present invention allows a DYSPAN (WRAN) system to continuously perform data transmissions while operating RF sensing such that service interruption and potential low system utilization problems are resolved. In addition, instead of sensing channels including the ones that are in use, a DYSPAN (WRAN) system according to the present invention shall only sense the selective channels so that reliable and timely RF sensing can be substantially assured.

The Selective-SSDT solution of the present invention provides the flexibility of strategic and adaptive channel selections for RF sensing, with the above mentioned two options as two special cases—selecting no channel and selecting all channels.

Figure 2:
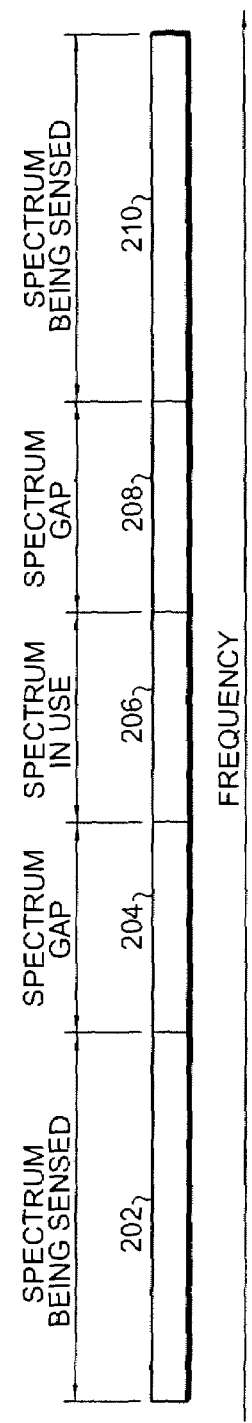
FIG. 2 shows RF sensing on selective spectrum overlapping with data transmissions.

As depicted in FIG. 2, a DYSPAN (WRAN) system 200, applying the Selective-SSDT concept, uses the in-band channel(s) 206 for data transmission and performs RF sensing on selective out-of-band channels 202 and 210 simultaneously. Spectrum gaps 204 and 208 specify "guard bands" between the in-band channels (transmission spectrum) and out-of-band channels (sensing spectrum) in order to mitigate adjacent interference caused by data transmission to the out-of-band channel sensing. The minimum width of the guard bands can be varied (taking either positive or negative values) and depend on factors such as the sensing technology, the transmission power of the DYSPAN (WRAN) system, and the incumbent licensed services need to be protected.

The bands of spectrum for RF sensing 202 and 210 shall be selected adaptively by the DYSPAN (WRAN) system (specifically by the base station) so as to provide the system the flexibility of optimizing both RF sensing performance and QoS of the DYSPAN (WRAN) system. For example, a DYSPAN (WRAN) system should select a band of spectrum 202 and 210 from which a significant number of vacated channels are most likely to be found, while reliable and timely RF sensing can be guaranteed.

The number of channels to be selected for RF sensing should also be adaptively adjustable. Sensing more channels can provide more information regarding channel occupancy, which is desirable for DFS decision-making. On the other hand, sensing more channels might require longer sensing time, more sensing reporting and report processing, which might negatively affect the QoS of the DYSPAN (WRAN) system. The base station should make an intelligent decision for an optimal trade-off of these two factors, i.e. the sufficiency of channel information and Quality-of-Services.

A DFS control technique called cognitive Dynamic Frequency Hopping according to the present invention is described below.

In order to satisfy the above-mentioned sensing control requirements, namely reliable and timely RF sensing guarantee and DYSPAN (WRAN) QoS satisfaction, cognitive Dynamic Frequency Hopping (DFH) can be performed based on the Selective Simultaneous Sensing and Data Transmission concept.

The Cognitive DFH technique that is based on Selective Simultaneous Sensing and Data Transmissions (SSDT) according to the present invention is described below.

As described above, the Selective-SSDT technique is a general and flexible solution for adaptive DFS decision-making. The selection of the size of the guard band (as shown in FIG. 2) provides such generality and flexibility. An infinite positive guard band allows no simultaneous sensing or transmissions. A negative guard band allows simultaneous sensing and transmission on overlapped channels. A positive guard band allows simultaneous sensing and transmission on non-overlapped channels. To simplify the description, a positive guard band is used, in the other words, in-band channels and out-of-band channels are not overlapped.

Operating in the Cognitive DFH mode, a DYSPAN (WRAN) system dynamically selects and switches operation frequencies (channels) for data transmissions in continuous time periods. The frequency selection is based on the simultaneous channel sensing performed along with data transmissions. Both frequency selections and the length of an operation period in which a WRAN system operates on a channel should be determined dynamically in real time by a cognitive engine.

Figure 3:
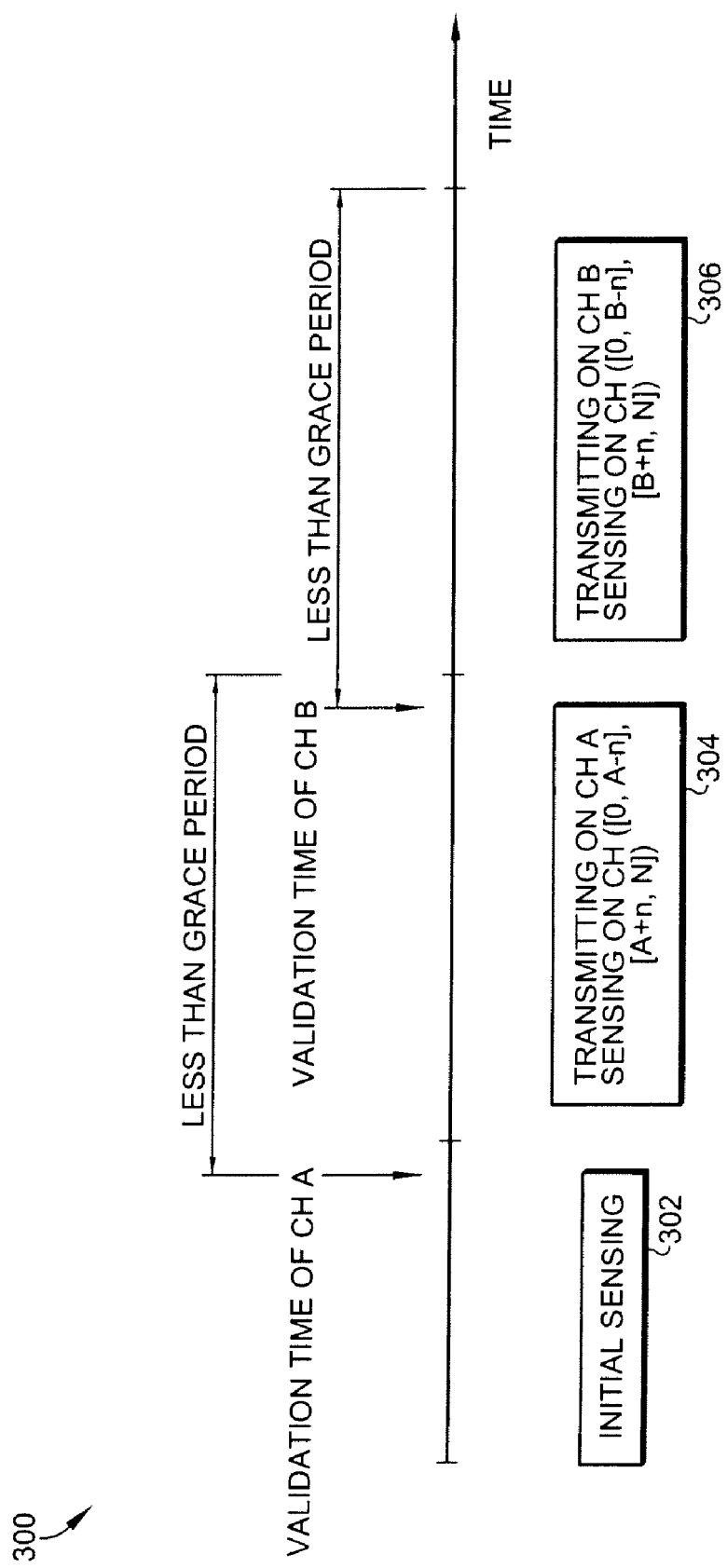
FIG. 3 shows cognitive dynamic frequency hopping with simultaneous selective RF sensing.

The DYSPAN (WRAN) operations applying Cognitive DFH technique are illustrated in FIG. 3. Note that although the case wherein the DYSPAN (WRAN) system operates on a SINGLE channel is shown in FIG. 3, the technique of the present invention can be applied to MULTIPLE channel cases without losing generality, as is described in further detail below.

The DYSPAN (WRAN) operations in DFH mode are carried out in continuous operation periods referred to as DFH Operation Periods that have variable lengths. Except the Initial Sensing period 302 (at the very beginning of the DYSPAN/WRAN operation for channel availability check), a DYSPAN (WRAN) system performs both data transmissions on a channel, say Channel A, and RF sensing on channels [0, A−n] and channels [A+n, N] in each operation period 304. Here Channel "0" and Channel "N" are referred to as the lower bound and upper bound of the sensing spectrum respectively and "n" is the number of channels in the guard band. In parallel with data transmissions the next channel to hop for data transmissions is selected. At the end of a DFH operation period, the WRAN system hops to the selected channel and starts the next DFH operation period.

The validation time of a channel is defined as the latest time at which the channel is validated to be vacant as indicated by measurement results of the RF spectrum sensing, and should be the end of the sensing duration for that channel. The grace period is defined to be the maximum period of time in which a licensed incumbent service can tolerate interference generated by licensed exempt (DYSPAN/WRAN) systems, starting from the beginning of the licensed incumbent service's operations, and is equivalent to the Channel Detection Time for the incumbent.

After hopping to a new channel, a DYSPAN (WRAN) system performs data transmission on that channel for a Cognitive DFH Operation Period 304 or 306. The length of a DFH operation period can be varied for a particular channel. The length of a DFH operation period shall not exceed the time period in which it is guaranteed that the DYSPAN (WRAN) operations on such channel do not cause any harmful interference to any licensed incumbent service. In other words, for a channel, say channel A, that is in use for data transmissions, the Cognitive DFH operation period of channel A shall be terminated before the validation time of channel A plus the length of a grace period (i.e. the Channel Detection Time), considering the worst case scenario that a licensed incumbent service appears immediately after the validation time of channel A.

The DFH operations of a DYSPAN (WRAN) system during a Cognitive DFH operation period are specified as follows:

1) The base station schedules the whole system (the base station and all the associated customer devices/CPEs) to hop (switch) to a channel, say channel A, based on the frequency selection decision made at the end of the previous operation period.
2) The base station and all CPEs in the system perform data transmissions on channel A 304;
3) The base station performs and schedules all CPEs to perform RF sensing on channels [0, A−n] and channels [A+n, N] simultaneously with data transmissions 304;
4) CPEs report sensing measurement results to the base station;
5) The base station processes sensing measurement reports;
6) The base station performs channel selections, and channel acquisitions when it is necessary;
7) The base station announces the frequency selection decision to be used for the next operation period to all CPEs in the system and to all neighbor DYSPAN (WRAN) systems.
8) Go to Step 1) for the next DFH Operation Period.

Channel setup and maintenance procedures that guarantee zero (negligible) frequency switching delay for cognitive DFH are now described.

Frequency switching overheads when a DYSPAN (WRAN) system switches to new frequency are considered. A novel channel setup and maintenance mechanism that guarantees frequency switching with zero (negligible) delay for cognitive DFH is presented.

Before switching to a new channel, a channel availability check has to be performed in order to ensure the channel availability (incumbent free). Also, the channel availability timing requirement has to be satisfied. In the WRAN scenario, the channel availability check time is 30 seconds.

Channel setup is to set up operation parameters for reliable communications on a selected new channel. Operations of channel setup may include initial channel(s) ranging between the base station and CPEs, and all other operations that are required to setup operation parameters for reliable communications on a selected channel.

In the WRAN scenario, the channel setup time may take up to 2 seconds, in which the integrated channel open transmission time is up to 100 ms.

The overhead for channel setup is required to initiate reliable communications on a new channel or a channel that is not effectively maintained.

Channel Move Messaging and Hardware Switching Time are also considered as frequency switch overhead and should be considered in the overhead of frequency switching to a new channel.

Once the transmission parameters have been setup for reliable communications on a channel, regular or periodic channel maintenances shall be performed by the DYSPAN (WRAN) systems to adjust the transmission parameters adapted to the dynamic channel conditions. Regular channel maintenance includes operations such as regular/periodic channel ranging.

Specified below is a channel setup and maintenance mechanism that guarantees zero (negligible) delay frequency switching according to the present invention (referring to FIG. 4):

1. Select and maintain a cluster of channels that have passed the Channel Availability Check 408, 418, 428. This channel cluster is referred to as Cluster A.
2. Perform (initial) channel setup 410, 420, 430 for new channels in Cluster A. Channels in Cluster A for which channel setup has been performed successfully are referred to as channels in Cluster B. Note that a channel that is not effectively maintained through regular channel maintenance is considered as a new channel.
3. Perform Cognitive Dynamic Frequency Hopping among channels in Cluster B.
4. Perform regular/periodic channel maintenance for the operation channel on which the DYSPSN (WRAN) is performing data transmissions.
5. The DYSPAN (WRAN) system shall schedule Cognitive Dynamic Frequency Hopping such that the maximum interval of regular (periodic) channel maintenances for all CPEs on every channel in Cluster B is not exceeded. The maximum maintenance interval for each CPE is to guarantee the effectiveness of transmission parameters obtained from the previous channel maintenance. A channel is identified as well-maintained if the above condition (maintenance interval less than the maximum allowed interval) is satisfied.
6. If a channel is not well-maintained, the DYSPAN (WRAN) system shall eliminate this channel from Cluster B.
7. Channel Move information is embedded in the MAC management messages that are regularly transmitted from the base station to CPEs. So the delay for channel move messaging is negligible.
8. The delay for Hardware Switching Time is considered to be negligible.

The mechanism described above combines regular (periodic) channel maintenance with cognitive dynamic frequency hopping over a cluster of vacated channels that are initially setup such that the channel set up delay for channel switching is eliminated.

The typical maximum maintenance interval for Wireless Broadband Access Networks (e.g. IEEE 802.16 WiMAX) is about 30 to 35 seconds.

Figure 4:
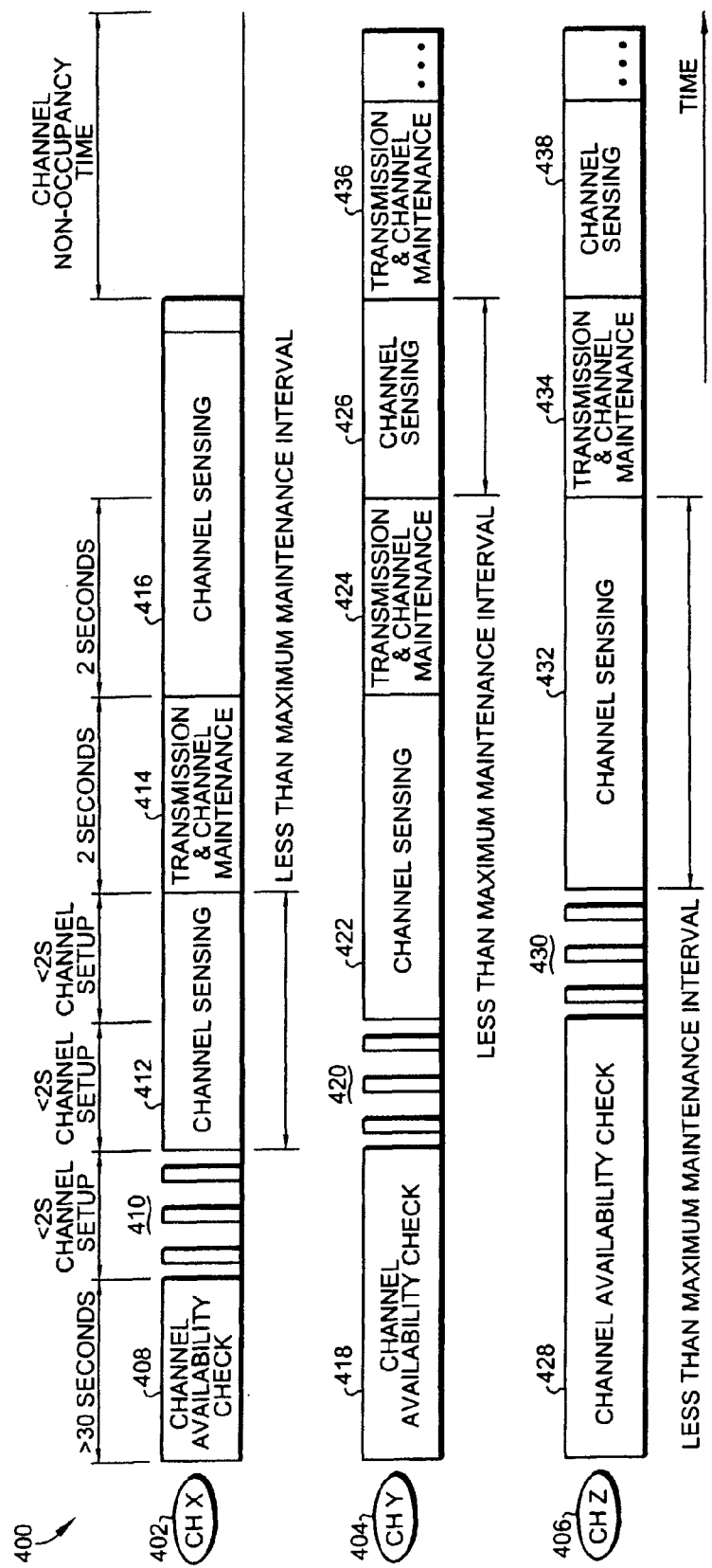
FIG. 4 is an example of zero delay cognitive dynamic frequency hopping.

FIG. 4 provides an example of Zero-overhead cognitive (dynamic) frequency hopping. Initially, Channel Availability Checks 408, 418, 428 are performed on Channel X, Y, and Z 402, 404, 406. After passing Channel Availability Check on for example channel X 402, the system 400 performs Channel Setup 410 on channel X 402, while continuing Channel Availability Checks on Channel Y and Z 404, 406. After having completed Channel Setup 410 on Channel X 402, the system 400 switches to channel Y 404, which has passed the channel availability check 418, and performs Channel Setup 420 on Channel Y 404, while performing channel sensing 412 on Channel X 402 and Channel Availability Check 428 on Channel Z 406. Similarly, the system switches to Channel Z 406 and performs Channel Setup 430 on Channel Z 406 after having completed channel setup 420 on Channel Y 404, while simultaneous channel sensing 412, 422 are performed on both Channel X 402 and Channel Y 404. Insuring incumbent-free condition on Channel X 402 through channel sensing 412, the system 400 switches to channel X 402 and performs data transmissions and channel maintenance 414, with simultaneous channel sensing 422 and 432 on channel Y 404 and channel Z 406. Similarly, the system 400 switches to channel Y 404 or channel Z 406 and performs data transmissions and channel maintenances 424, 434 while simultaneous channel sensing 416, 426, 432 are performed. If an incumbent has been detected during the channel sensing period 416 of channel X 402 (as an example), the system 400 shall avoid using channel X 402 for at least a period of Channel Non-occupancy Time. In such condition, the system 400 continues Cognitive DFH operations 436, 438 on channel Y 404 and channel Z 406.

A cluster of vacated channels are maintained in order to enable:

Zero-overhead channel switching.

Flexible channel management for multiple DYSPAN (WRAN) systems.

Collision Avoidance for Frequency Switching is now described. There potentially exists a "hidden node" problem that would cause two neighbor DYSPAN (WRAN) systems to collide on channel use. Two neighbor DYSPAN (WRAN) systems might independently select the same frequency to switch to for their next operation periods. Their frequency switching might have taken place before they are able to detect such a conflicting situation. In such a case, collision occurs if these two systems can interfere with each other.

Figure 5:
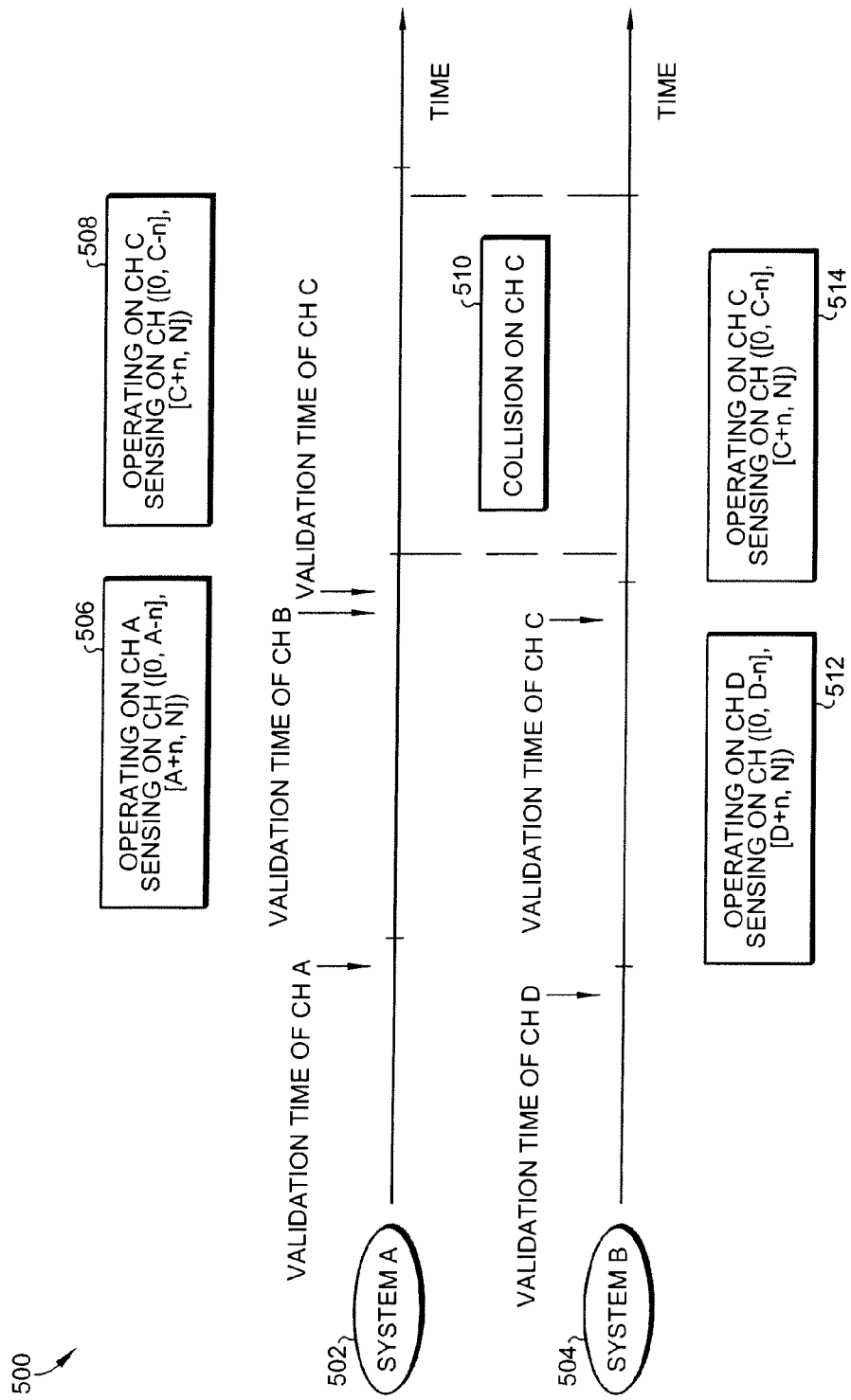
FIG. 5 shows cognitive dynamic frequency hopping collision caused by hidden nodes.

FIG. 5 depicts the "hidden node" problem 500 and the consequent collision of frequency use when DFH is applied. Two neighbor systems A and B, 502 and 504, both detect that channel C is valid and the validation times of channel C for these two systems are relatively close. Assume that system A and B both independently decide to select channel C to be used in their next DFH operation periods which are overlapped with each other. If both system A and B hop to channel C approximately at the same time in their overlapped DFH operation periods, collision 510 on channel C occurs. The occurrence of the channel-use collision is due to the fact that a system has no knowledge about the frequency selected by its neighbors for the future use in an overlapped operation period, and such channel-use information can only be detected when a potential colliding channel is actually in use.

Figure 6:
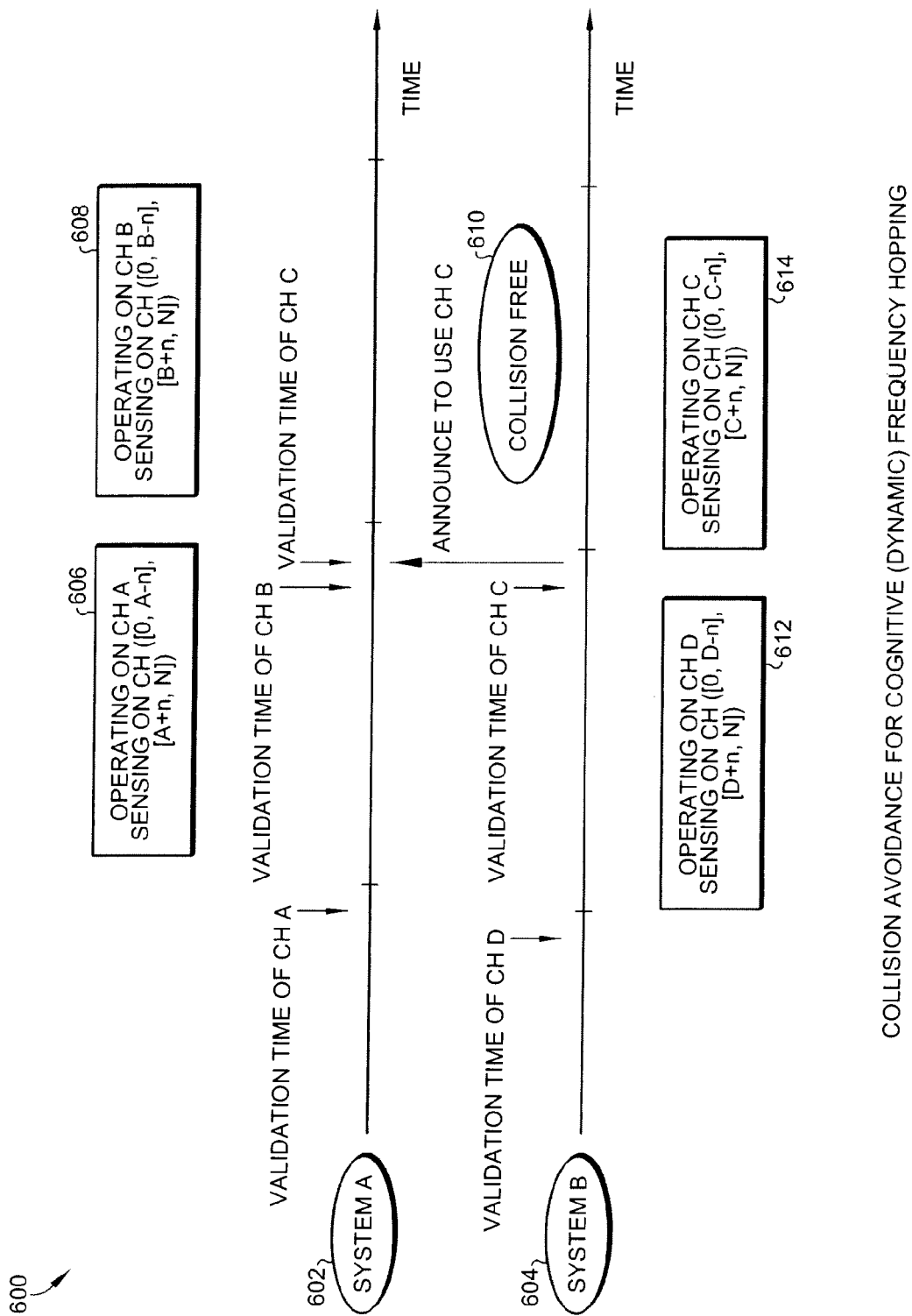
FIG. 6 illustrates collision avoidance for cognitive dynamic frequency hopping.
Figure 7:
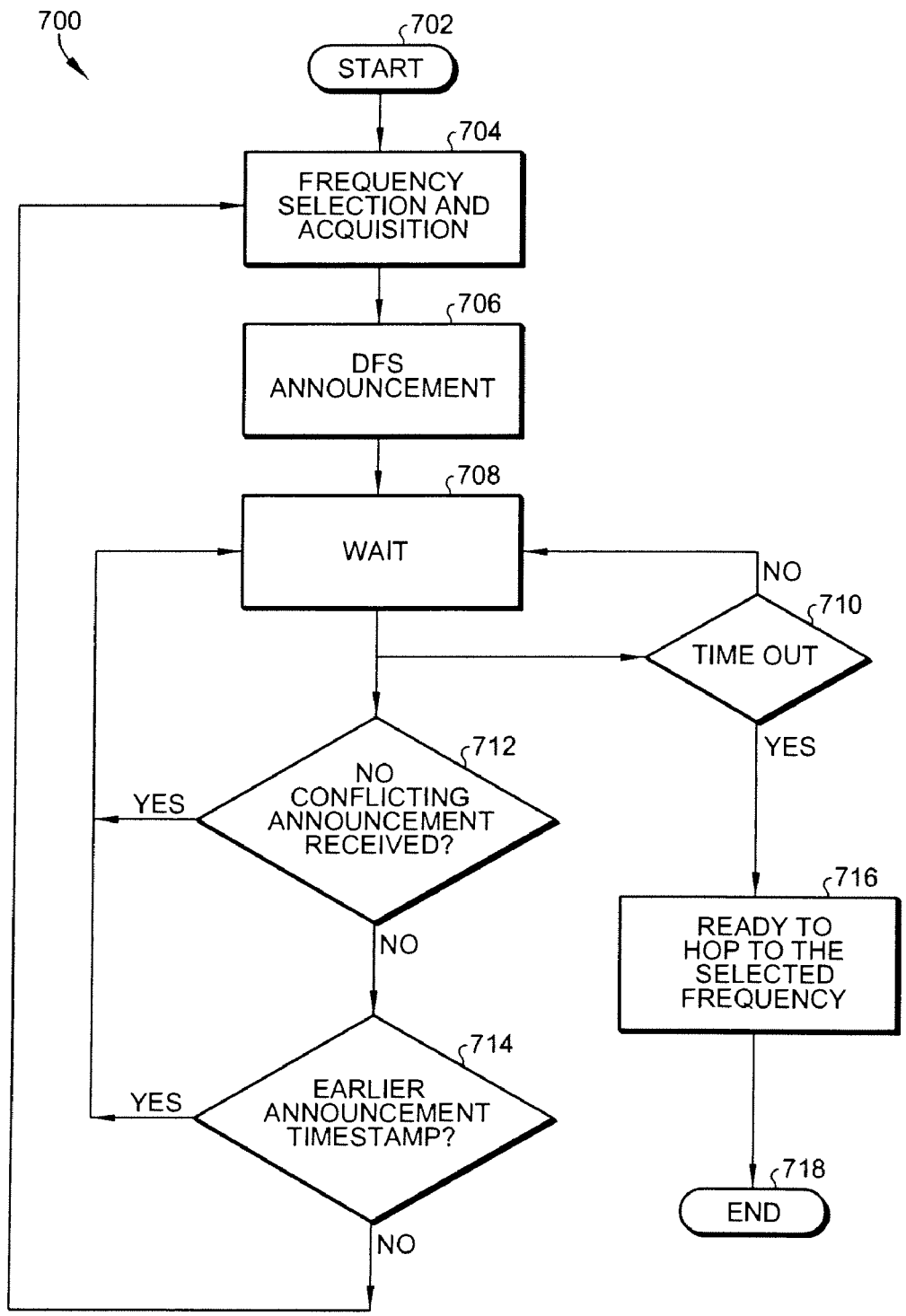
FIG. 7 shows a DFH/CA algorithm.

To avoid frequency hopping collision, the present invention introduces a technique called DFH/CA (collision avoidance), as is illustrated in FIGS. 6 and 7. Note that such collision avoidance technique is general enough to be applicable to general frequency switching.

FIG. 6 illustrates collision avoidance for cognitive (dynamic) frequency hopping 600 for a System A 602 and a System B 604. System A 602 and system B 604 are all working in DFH mode (606, 608, 612, 614). After System B selects channel C for the next hopping period, it announces such decision to all neighbors—System A in this example—before hopping to channel C. System B then waits for responses from its neighbors, and hops to channel C if no responses are received. System A monitors and receives DFH announcement messages. When a DFH announcement (indicating channel C will be in use by System B) is received, System C selects a different channel—channel B—hence a collision can be eliminated (collision free 610).

A collision-avoidance algorithm 700 for Cognitive DFH is shown in FIG. 7. After a DYSPAN (WRAN) system has selected a frequency as the next hopping frequency 704, it shall announce this DFH decision to all neighbor DYSPAN (WRAN) systems 706 and wait for a reasonable amount of time 708 (round trip time at minimum) before hopping to the selected frequency. All DYSPAN (WRAN) systems shall monitor the DFH announcements from neighbor systems at all times. A DYSPAN (WRAN) system that is announcing a COGNITIVE DFH decision can hop to the selected frequency 716 when the waiting period is expired 710, only if the system does not receive another COGNITIVE DFH announcement from any neighbor that selects the same frequency 712. The waiting period is to account for the situation in which a neighbor system transmits the same announcement before receiving the COGNITIVE DFH announcement, and the minimum waiting period should be a round trip propagation delay between two neighbor systems.

When receiving a COGNITIVE DFH announcement, a DYSPAN (WRAN) system should react in one of the following three ways under the appropriate conditions. If a DYSPAN (WRAN) system receives a COGNITIVE DFH announcement without having simultaneously announced the same frequency selection, it shall not hop to the frequency selected by the received announcement in the next operation period. On the other hand, if the received COGNITIVE DFH announcement has the same frequency selection as the DYSPAN (WRAN) system has just announced, and if the time stamp of its own announcement is earlier than the time stamp of the received one 714, the DYSPAN (WRAN) system can hop to the selected frequency in the next operation period after the waiting period is expired. Otherwise, if the time stamp of its own announcement is equal to or later than the time stamp of the received announcement for the same frequency selection, the DYSPAN (WRAN) system shall not hop to the selected (conflicting) frequency in the next operation period.

Although the above description assumes that the DYSPAN (WRAN) system operates on a single channel, the technique of cognitive dynamic frequency hopping (with collision avoidance) with simultaneous selective sensing can be naturally extended to DYSPAN (WRAN) systems that operate on multiple channels.

A relatively simple extension of the COGNITIVE DFH/CA+Selective Sensing technique to multiple channels is to treat a single channel in the above description as a set of channels that have the same validation times. This assumption is realistic if it is feasible that a set of contiguous channels can be sensed and validated all at once.

Figure 8:
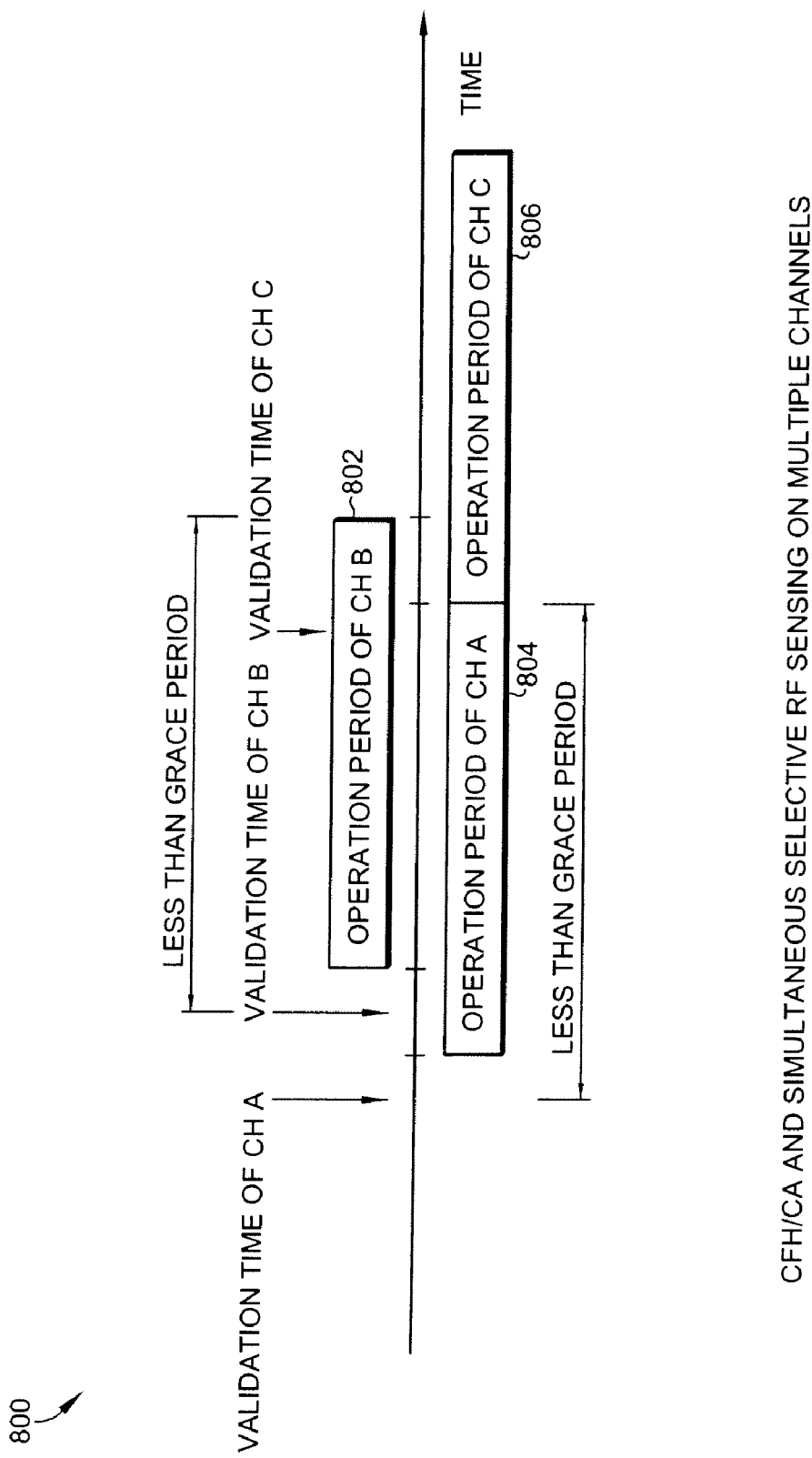
FIG. 8 shows DFH/CA and simultaneous selective RF sensing on multiple channels.

For a more general case, FIG. 8 shows how the COGNITIVE DFH/CA with the simultaneous selective sensing technique is applied to a DYSPAN (WRAN) system 800 that operates on two channels in parallel. In this case, the DYSPAN (WRAN) system (the base station) shall record the validation time of each channel that is in use in order to guarantee the operation period of each operating channel does not exceed the limit constrained by the grace period of licensed incumbent services. Specifically, the interval between the validation time of channel A and the termination time of the Operation Period of Channel A 804 shall be less than the Grace Period. In parallel with operation on channel A, the systems can operate on channel B insuring that the interval between the validation time of channel B and the termination time of the Operation Period of Channel B 802 shall be less than the Grace Period. Similarly operation on channel C 806 can be performed in parallel with operation on channel B 802 following the same rule as described above.

An overview of DFS messaging control is now described. DFS messaging is a mechanism of exchanging control packets between the base station and CPEs in order for DFS decision-making and DFS assignment. Information exchanged through DFS messaging includes reporting schedules, RF sensing reports, DFS assignments, and other related signaling messages. Along with RF sensing, DFS messaging is performed simultaneously with data transmissions. The advantage of such parallel operations is that sufficient time for RF sensing and DFS messaging is guaranteed without affecting QoS of the data transmission services such as latency and throughput. The DFS messaging control algorithm 900 is shown in the following flow chart in FIG. 9.

A DYSPAN (WRAN) system starts 902 the operations with initial RF sensing 904 that searches for available frequencies for the data transmission services (channel availability check). The base station then announces the DFS decision 906 based on the RF sensing results to both CPEs in the system and the base stations of neighbor systems. The DYSPAN (WRAN) system will then hop to the selected frequency if the DFS decision is effective and start data transmissions. Simultaneously with data transmissions, the Selective RF sensing 908 is continuously performed on frequencies for which reliable sensing performance can be achieved.

The base station shall schedule measurement reporting 910 of all CPEs after reliable RF sensing by CPEs have completed. The goal of the report scheduling 910 is to facilitate reliable, efficient and flexible measurement reporting. All CPEs shall report their RF sensing results 912 in accordance with the report scheduling.

The base station will acknowledge the successful measurement reports and re-schedule 918 the unsuccessful measurement reports until all CPEs have reported successfully 914 or the maximum number of scheduling retries has been exceeded for the unsuccessful reporting 916. After that the base station processes and summarizes the RF sensing reports of the whole system (information from neighbor systems and database of the service provider shall also be included). The base station then selects the best frequencies to be used in the next DFH operation period and makes announcements to all CPEs in the system and to all neighbor systems (base stations) regarding its DFS decision 906. Finally, after adjustments on the DFS decision according to the feedbacks from the CPEs and the neighbor systems to the DFS announcement 906, the base station assigns the new frequency selected to the CPEs for use in the next frequency hopping period.

The RF sensing report 912 is now described. The base station and CPEs shall be able to detect at least four channel conditions as follows:

Licensed incumbent service occupied
Another DYSPAN (802.22 WRAN) system occupied
Noisy
Vacant Bit-vector reporting is now described. CPEs shall have signal processing capabilities to estimate and identify these channel conditions. Instead of including the raw measurement data in the measurement reports, CPEs report the channel conditions using a simple bit vector. Two bits per channel is sufficient to represent the channel condition in the measurement reports for the above four possible conditions.

On-request raw-data reporting is now described. The base station shall also be able to request the CPEs to report the raw data of the sensing measurement. Although this method requires more bandwidth for transmitting sensing reports, it enables advanced data analysis to be performed on the raw data of the sensing measurement that would only be feasible in the base station.

Combining the bit-vector reporting and the on-request raw-data reporting, a DYSPAN (WRAN) system can achieve a balance between efficiency of report transmission and accuracy of data analysis.

The validation time for each non-incumbent-occupied channel shall be included in the measurement report.

Scheduling of measurement report 910 and measurement report transmissions 912 are now described. The measurement reports shall be transmitted in the scheduled transmission opportunities from CPEs to the base station (uplink transmissions). The goal of the measurement report scheduling is to facilitate reliable, efficient and flexible measurement reporting. Three scheduling methods are feasible: polling, "poll-me", and contention.

In the polling method, the base station polls CPEs to transmit measurement reports by scheduling transmission opportunities for reporting in the up-link MAP. When being polled, a CPE should transmit the measurement report if one is ready. Otherwise a CPE should either return feedback information or other useful data to the base station if possible. The base station should provide redundant report transmission opportunities for each CPE in order to enhance the report transmission reliability. In case the report transmission opportunities are ignored by a CPE, the wasted bandwidth (polling overhead) is negligible given the allocated bandwidth for transmitting a bit-vector report is usually negligibly small. The base station should also poll a CPE only when the measurement report is likely to be ready in order to reduce polling overhead.

In the "Poll-me" method a CPE can request bandwidth allocation for the report transmission by using a 1-bit "poll-me-for-reporting" flag in the Bandwidth Request packet data unit (PDU)

In the Contention method, the base station shall schedule or provide contention-based transmission opportunities for report transmissions. CPEs shall send polling requests or transmit measurement reports through the contention transmission opportunities for time-critical reporting situations.

Report re-scheduling and acknowledgement 918 is now described. The base station shall re-schedule CPEs that have been scheduled (polled) but whose measurement reports have not been successfully received by the base station. The re-scheduling is through report transmission polling as described above in a subsequent up-link MAP.

The base station implicitly acknowledges measurement reports that it has successfully received. This is done by ignoring report re-scheduling for CPEs from which reports have been successfully received. In other words, if a CPE, which has been polled and transmitted a measurement report in a previous frame, is not re-polled in the subsequent up-link MAP, the CPE shall regard that its report has been successfully received by the base station.

DFS Decision-making, Announcement, and Adjustment 906 is now described. After collecting and processing measurement reports received from CPEs, the base station selects the valid channels to use for the system in the next cognitive DFH operation period. If the measurement reports are represented using bit-vector format, DFS decisions could be made by the base station using simple logic ORs. The DFS decision shall be announced to all CPEs in the system before the selected frequency is assigned to be used in the next cognitive DFH operation period. The DFS announcement shall be made early enough so that CPEs can return feedbacks regarding a defective DFS decision before the current COGNITIVE DFH operation period terminates. The base station shall adjust a defective DFS decision if it is indicated by feedbacks from CPEs. The DFS decision shall be announced to all neighbor systems to prevent colliding DFS decisions among neighbor systems.

In addition to avoidance of harmful interference to licensed incumbent services as the first priority, a DYSPAN (WRAN) system shall coexist with other DYSPAN (WRAN) systems by sharing the spectrum holes (spectrum unused by licensed incumbent services).

The objective of DYSPAN (WRAN) system coexistence and spectrum hole sharing is to provide fair, efficient, and adaptive spectrum accesses for DYSPAN (WRAN) systems. A spectrum sharing mechanism according to the present invention is called On-Demand Spectrum Contention, which integrates DFS and TPC with spectrum contentions and provides fairness, efficiency, and adaptability of spectrum access using active inter-system coordination.

Since the coordinative coexistence mechanism is favorable for fairness, efficiency and adaptability, it becomes very critical to provide efficient methods for inter-system communications in order to guarantee the feasibility and the overall efficiency of the coexistence (spectrum sharing) mechanism. A method called Logical Control Connections for inter-system coordination is described according to the present invention, which can be established and maintained both over-the-air and over-the-backhaul with very low communication overhead incurred.

In the following two subsections, the On-Demand Spectrum Contention (ODSC) spectrum sharing mechanism and the inter-system communications method using Logical Control Connections (LCC) are both described in detail.

Figure 10:
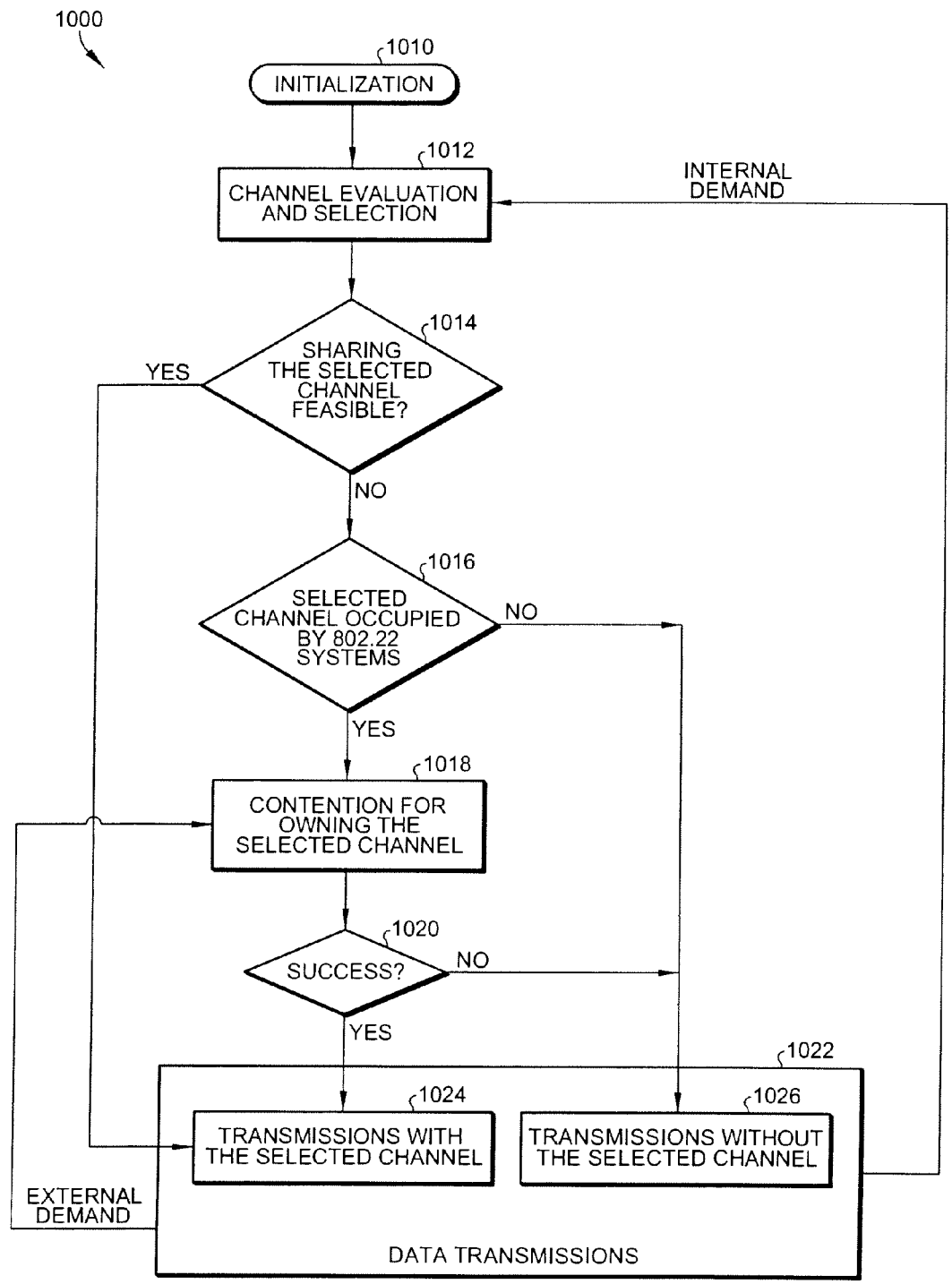
FIG. 10 shows an on-demand spectrum contention algorithm.

The Spectrum sharing mechanism called On-Demand Spectrum Contention (ODSC) according to the present invention is now described. FIG. 10 illustrates the ODSC algorithm 1000.

Starting with system initializations 1010, a ready-to-operate DYSPAN (WRAN) system first performs channel evaluations and channel selections 1012 to detect spectrum holes. Note that the licensed incumbent service protection is an essential and integrated component of the DYSPAN (802.22 WRAN) co-existence mechanism being described here. Operations of channel evaluation and selection include RF sensing, measurement evaluations, measurement reporting, report processing and frequency selection, which are proposed and described in detail in the "Licensed Incumbent Service Protection" section.

Then the DYSPAN (WRAN) system verifies whether non-exclusive sharing of the selected channels is feasible 1014. Non-exclusive sharing of a selected channel is to share the selected channel through transmission power control (TPC) such that DYSPAN (WRAN) systems sharing the same channel do not cause harmful interference to one another. A non-exclusive spectrum sharing method is feasible as long as the maximum achievable signal-to-interference-ratio (SIR) on the selected channel is higher than the required SIR of the DYSPAN (WRAN) for the supported services.

If non-exclusive sharing of the selected channels is feasible, the DYSPAN (WRAN) system then makes a DFS decision and schedules data transmissions on the selected channels with appropriate TPC settings 1024. DFS announcing and DFH/CA take place before data transmissions are performed on the selected channels.

On the other hand, if non-exclusive sharing is unfeasible, exclusive sharing of the selected channels shall be performed. The exclusive channel sharing problem is resolved through spectrum contentions 1018 which are facilitated by inter-system coordination. It is assumed that the same type of DYSPAN (802.22 WRAN) systems can only effectively communicate with one another for coordination of spectrum sharing of the selected spectrum hole—such a simple assumption can be extended so that different type of DYSPAN systems can effectively communicate for spectrum sharing coordination (for example, 802.22 WRAN and 802.16 WiMAX systems).

Based on the above assumption, if the selected channel (spectrum hole) is not occupied by a specific type of DYSPAN (e.g. 802.22 WRAN) system 1016, the DYSPAN (802.22 WRAN) system has to give up the effort of spectrum sharing on the selected channel and performs data transmissions without using the selected channels if it is possible 1026. Otherwise, the DYSPAN (WRAN) system should initiate the spectrum contention process 1018 for the ownership of the selected channels with the DYSPAN (WRAN) system of the same type that is occupying the spectrum.

The basic components of the spectrum contention process 1018 include Contention request, Contention resolution, and Contention response.

If the contention succeeds 1020, the DYSPAN (WRAN) system acquiring the selected channel makes a DFS decision and schedules data transmissions on the selected channels 1024 starting from the time agreed upon by both contending systems (a grace period is described in further detail below). DFS announcing and DFH/CA shall take place before data transmissions are performed on the acquired channels.

If the contention fails, the DYSPAN (WRAN) performs data transmissions without using the selected channels if it is possible 1026. The DYSPAN (WRAN) system that is occupying the selected channel shall release the channel (stop scheduling data transmissions) at the time (after a defined grace period) agreed upon by both contending systems.

Figure 9:
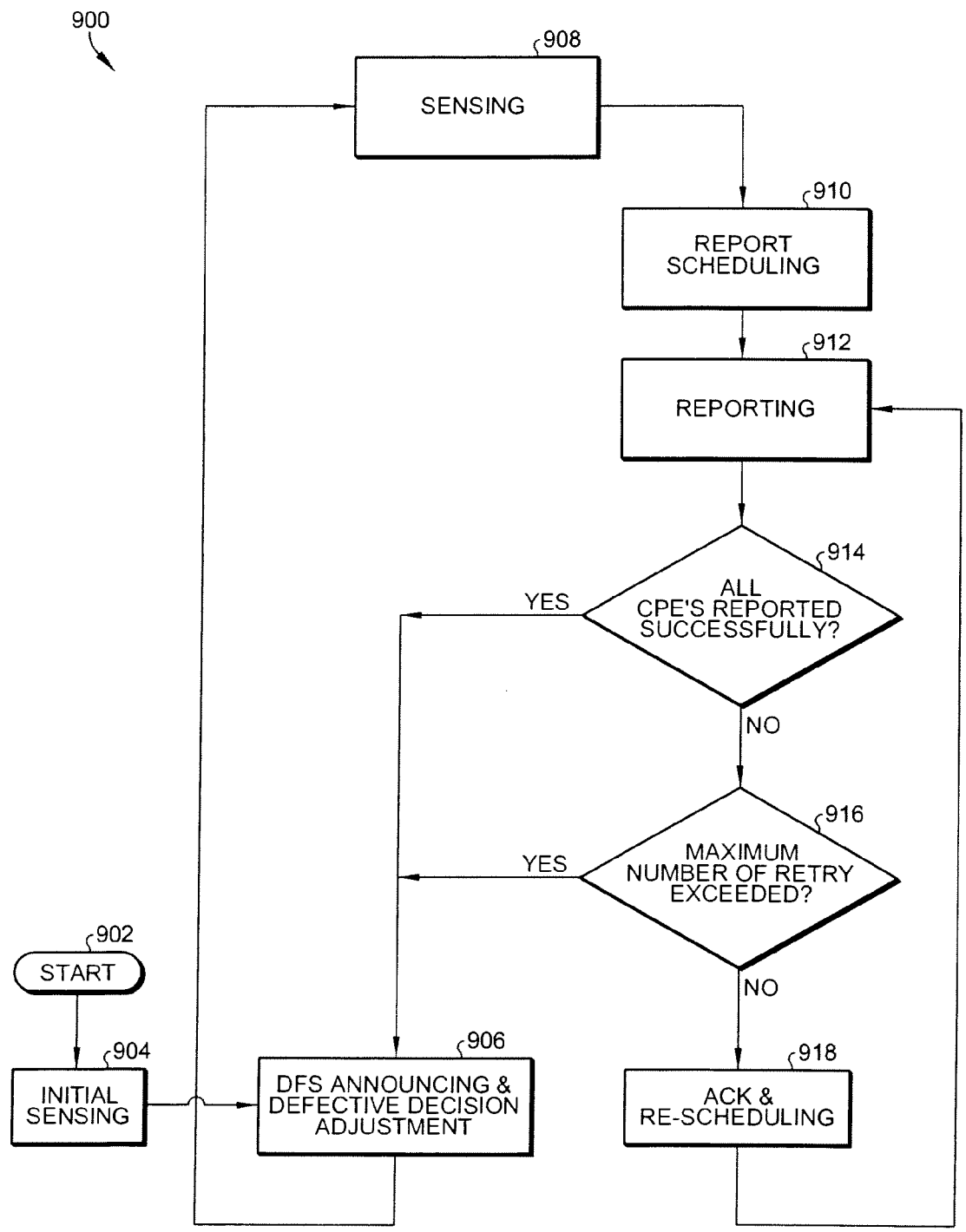
FIG. 9 shows a DFS messaging control mechanism.

In the data transmissions state 1022 of a DYSPAN (WRAN) system, as shown in FIG. 9, two types of demands can initiate an iteration of the spectrum sharing process 1000. These are internal demands and external demands.

Internal demands are generated by a DYSPAN (WRAN) system itself and are the consequences of the channel condition and workload condition analysis performed by the DYSPAN (WRAN) system. For example, when the current channel condition is not able to support the QoS of the given admitted service workloads, an internal demand is generated and initiates an iteration of the full spectrum sharing process 1000 so that a better channel or more channels can be acquired to satisfy the QoS requirements of the given workloads.

External demands are coexistence requests received from other DYSPAN (802.22 WRAN) systems. When an external demand is received, a DYSPAN (WRAN) system shall initiate spectrum contention iteration 1000.

Figure 11:
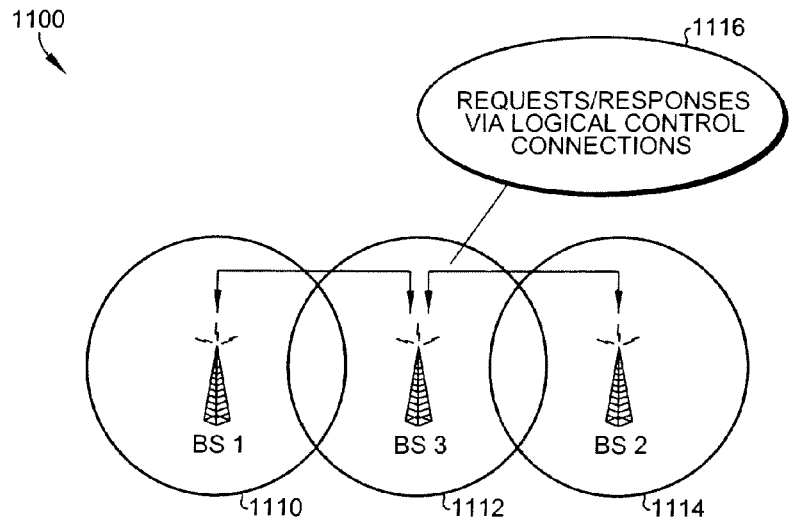
FIG. 11 shows a coexistence scenario for 802.22 systems.
Figure 12:
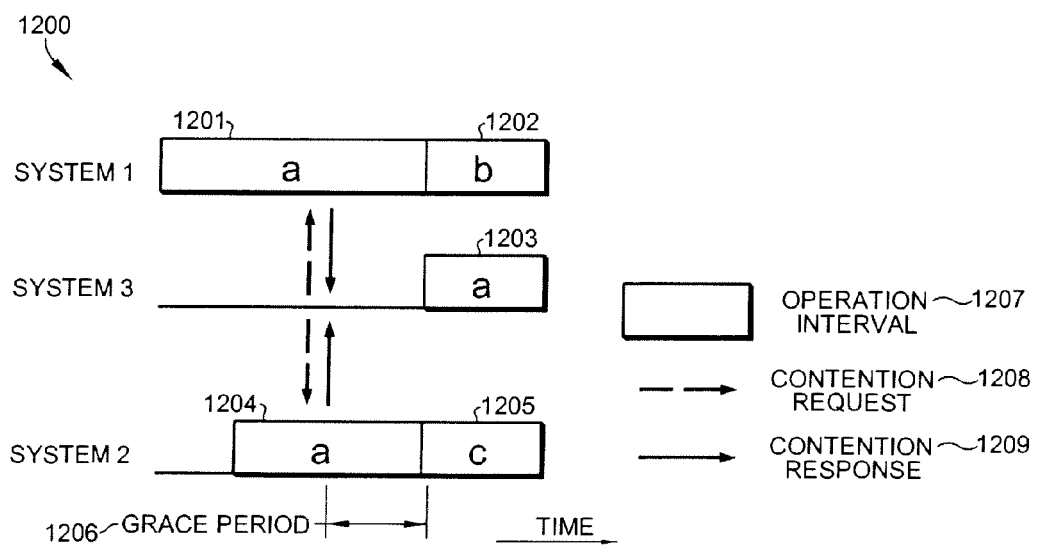
FIG. 12 shows an example of ODSC.

The ODSC mechanism 1000 using a coexistence scenario example 1100 is depicted in FIGS. 11 and 12.

In this coexistence scenario, DYSPAN (WRAN) system 3 1112 has overlapped maximum coverage areas with both DYSPAN (WRAN) system 1 1110 and DYSPAN (WRAN) system 2 1114, but the maximum coverage areas of system 1 1110 and system 2 1114 do not overlap. Assume harmful interference exists in the overlapped coverage areas if both systems operate on the same frequency simultaneously. So DYSPAN (WRAN) system 3 1112 needs to coexist with both system 1 1110 and system 2 1114. As shown in FIG. 11, inter-system communications for co-existence are via Logical Control Connections (LCC) 1116 which allows simultaneous coexistence communications and data transmissions. LCC will be described in detail in the following section.

FIG. 12 shows an example of ODSC 1200 among systems in the above scenario 1100. Initially system 1 and system 2 are both operating on channel "a" for data transmissions simultaneously 1201, 1204, and system 3 just starts its operation and does not occupy any channel. Internal demands of system 3 for bandwidth to support data services initiate system 3 to perform spectrum acquisition 1000.

The channel evaluation process 1012 indicates that channel "a" is the only channel that is not occupied by any licensed incumbent service in system 3's coverage area. System 3 then selects channel "a" as a candidate for data transmissions 1203. Meanwhile, system 3 also detects that channel "a" is occupied by both system 1 and system 3, and non-exclusive sharing of channel "a" is not feasible.

System 3 generates and sends spectrum contention requests 1208 to both system 1 and system 2 contending for channel "a". After receiving the contention request 1208 from system 3 as an external demand, both system 1 and system 2 initiate their spectrum contention process 1000 and then return system 3 a contention response message 1209 respectively indicating contention results. In case of losing the contention, which is the case for system 1 and system 2, a DYSPAN (WRAN) system shall include in the contention response message 1209 the time at which the occupied channel will be released (channel release time). The channel release time shall not be immediately after the time of contention resolution and a DYSPAN (WRAN) shall be allowed to continue the data transmission on the lost channel for up to a maximum grace period 1206 before the lost channel is released (as shown in FIG. 12).

After winning channel "a" 1020 from both system 1 and system 2, system 3 shall announce the DFS decision of using channel "a" and schedule data transmission services on channel "a" 1203, 1024 starting from an appropriate time which is a summary of the channel release times received from the other two systems.

On the other hand, after losing a channel 1020 (channel condition change) a DYSPAN (WRAN) system should perform another iteration of ODSC operations 1000 initiated by internal demands in order to acquire sufficient bandwidth to maintain the on-going data transmission services before the just lost channel is released. In this example, system 1 and system 2 acquire channel "b" 1202 and channel "c" 1205 respectively before channel "a" is released.

The properties of the ODSC mechanism in this section are characterized in terms of efficiency, adaptation and fairness. Efficiency includes low overhead and low complexity.

Coexistence overheads are only incurred when there are either internal or external demands. There is no constant coexistence overhead that is necessary. Coexistence overheads include communications and computations incurred for coexistence. Particularly, communications for coexistence are through very low overhead logical control connections 1116 (described later), which allow overlapping of coexistence communications with data transmission services 1200. Only a simple contention mechanism 1000 is required to coordinate multiple DYSPAN (WRAN) systems for coexistence purposes. No complicated mechanism for spectrum negotiation, allocation or scheduling is needed. Decision-making (contention resolutions) for spectrum sharing is distributed to be performed in individual systems. This provides the advantage of scalability compared to centralized approaches.

The ODSC mechanism of the present invention is highly adaptive to both internal demands and external demands for inter-system coexistence and radio resource management, which are usually interleaved together, in real time. The internal demands include RF channel conditions and workload conditions (rate/QoS requirements). Dynamic channel evaluations/selections 1012 and spectrum sharing/contentions 1018 are initiated adapting to internal demands. The external demands include coexistence (spectrum contention) requests from neighbor DYSPAN (WRAN) systems. Spectrum contentions 1018 can be directly initiated responding to the external demands.

The ODSC mechanism of the present invention can provide both local/short-term and global/long-term fairness for spectrum accesses. The ODSC mechanism resolves exclusive-sharing of spectrum holes through the contention-based solution that provides fair spectrum accesses (equal right to access the RF spectrum) for every DYSPAN (WRAN) system at any time. The ODSC mechanism is an iterative process that can be initiated by either internal or external demands adapting to various workload and environment conditions. Such an iterative process of adaptive spectrum contention can lead to long term global (multi-systems) fairness.

In summary, the ODSC mechanism of the present invention provides an efficient, self-organized, adaptive and fair framework for coexistence and (inter-system) radio resource management of DYSPAN (802.22 WRAN) systems.

As mentioned in the previous sections, inter-system communications are required for collaborative coexistence of DYSPAN (802.22 WRAN) systems, and the development of efficient methods for inter-system communications is critical to guarantee the feasibility and overall efficiency of the collaborative coexistence mechanism. A communications method called Logical Control Connections for the inter-system coordination according to the present invention is described, which can be established and maintained both over the air and over the backhaul with very low communications overhead incurred in terms of spectrum bandwidth, messaging latency, and hardware/software complexities.

An Over-the-air Logical Control Connection is to establish a connection-based logical communication channel over the air between two base stations that manage two DYSPAN (WRAN) systems respectively. The idea of Over-the-air Logical Control Connections is based on the following two key concepts: Bridge CPE and Coexistence Connections.

Figure 13:
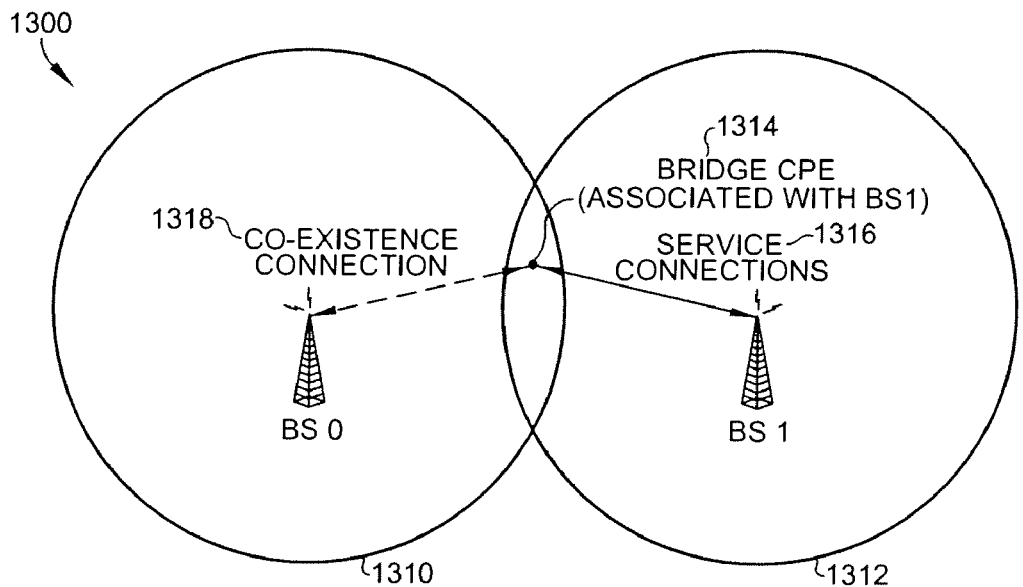
FIG. 13 shows a bridge CPE and coexistence connections.

As shown in FIG. 13, a Bridge CPE (B-CPE) 1314 is located in the overlapping coverage areas of two/multiple DYSPAN (WRAN) systems 1310 and 1312, for which co-existence is required. Note that if there is no CPE located in the overlapping coverage areas of two/multiple DYSPAN (WRAN) systems, there should be no coexistence concerns. A B-CPE, as a regular CPE, associates with one of the base stations and establishes connections for data transmission services, which are referred to herein as Service Connections 1316. The associated base station for data transmissions is called Service Base Station (S-BS) 1312 and the association is called Service Association. A Bridge CPE is selected by its service BS for co-existence communications. Requested by its service BS 1312, a bridge CPE 1314 associates with another base station, called Coexistence Base Station (C-BS) 1310, with which the service BS requires establishing co-existence communications. The association between the Bridge CPE 1314 and the Coexistence BS 1310 is referred to as a coexistence association. After it is associated with the Coexistence BS, the Bridge CPE establishes connections with the Coexistence BS, and the established connections are called Coexistence Connections 1318 and are used only for coexistence communications. A Logical Control Connection is established between the service BS and the coexistence BS over the service connection and the coexistence connection, with a bridge CPE as the relay.

Figure 14:
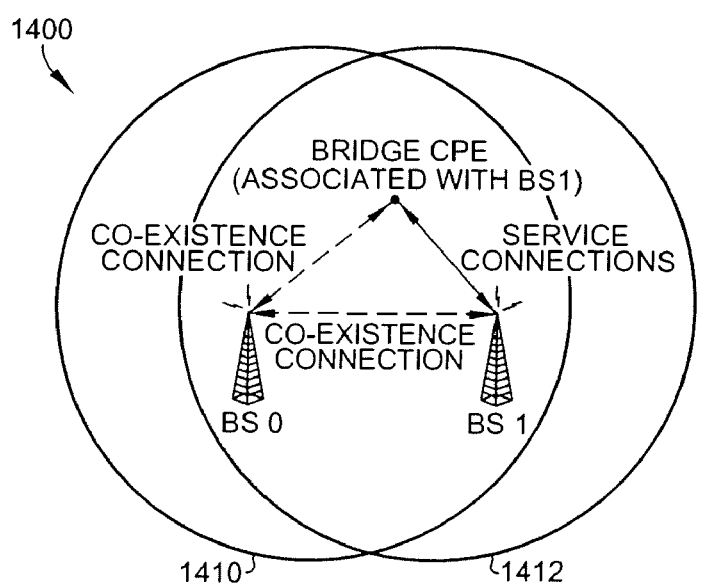
FIG. 14 shows coexistence connections between two base stations.

A coexistence connection 1318, as a regular connection in nature, is a connection-based logical control channel that only carries communications for inter-system coexistence. A Coexistence Connection is established and maintained between a bridge CPE 1314 and a coexistence BS 1310, when requested by the service BS of the bridge CPE. A Coexistence Connection can also be established and maintained between two base stations when they are within range of each other, as shown in the arrangement 1400 of FIG. 14. In this case, one of the base stations 1410 behaves as a CPE of the other base station 1412.

A coexistence connection is established and maintained on physical RF channels that are occupied by the coexistence BS 1310, 1410. No extra physical RF channel is consumed for coexistence connections. The establishment and maintenances of a coexistence connection is performed along with data transmissions of the bridge CPE 1314 (or service BS 1412) controlled by the service BS 1312. The establishment and maintenances of coexistence connections shall be in principle the same as those for service connections, and shall include operations of ranging, connection acquisitions, and the like.

The service BS shall guarantee that the establishment and maintenance operations of coexistence connections are not co-scheduled with service data transmissions on the bridge CPE. The scheme for co-scheduling resolutions is described in the next section.

Over-the-air coexistence communications via LCC is established between the service BS and the coexistence BS over the service connection and the coexistence connection, with a bridge CPE as the relay. Functionalities of over-the-air coexistence communications are for coexistence purpose only, and include messaging for on-demand spectrum contention, sensing measurement sharing, transmission parameters (such as frequencies, transmission power), and the like.

Figure 15:
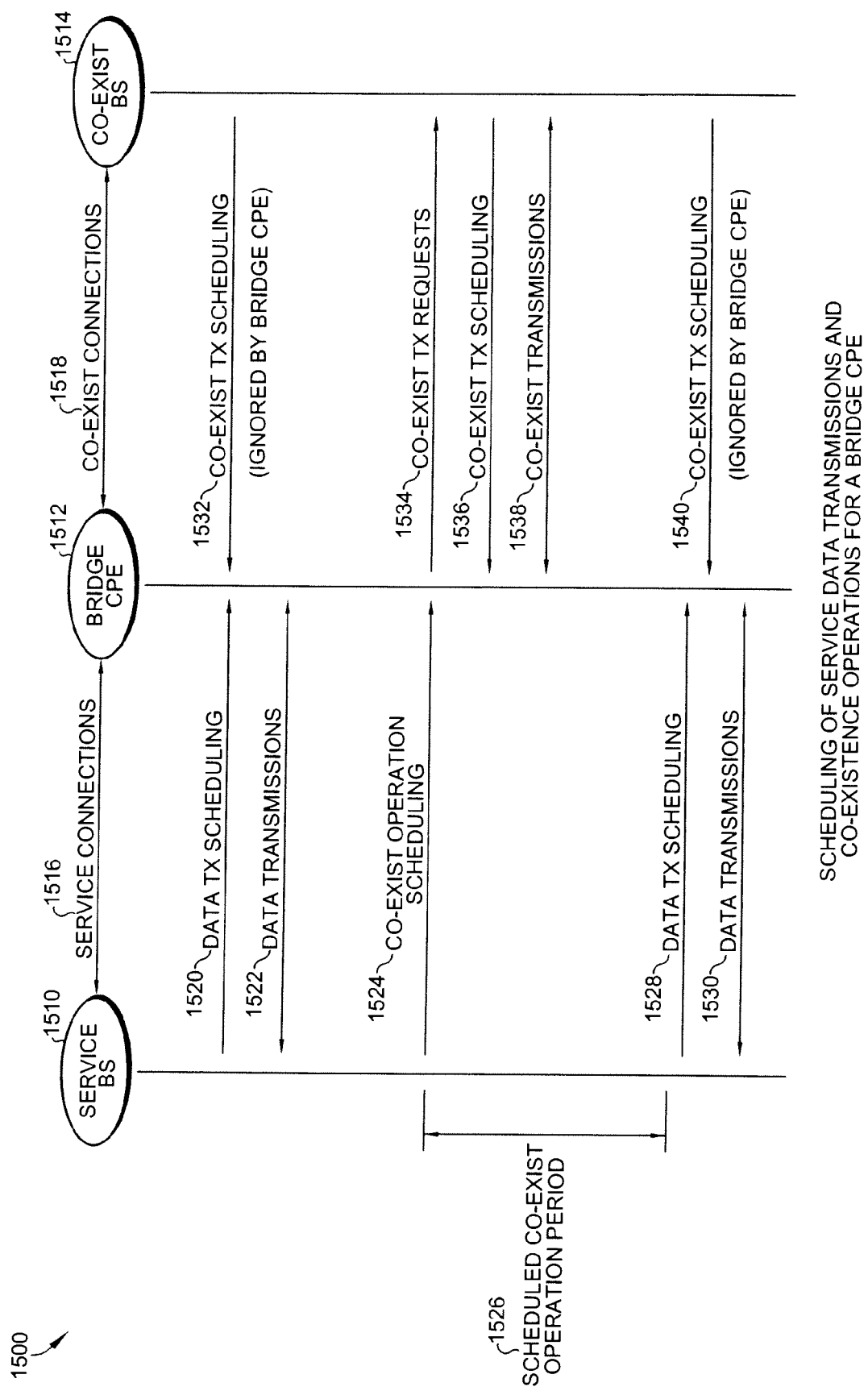
FIG. 15 shows scheduling of service data transmissions and coexistence operations for a bridge CPE.

For a Bridge CPE with a single TX/RX front end, it shall be guaranteed that service data transmissions are not co-scheduled (collided) with coexistence operations (i.e. connection establishment and maintenance, control message exchange, etc.) on the Bridge CPE. For this matter, the Service BS shall control and schedule the coexistence operations between the Bridge CPE and the Coexistence BS. The scheduling scheme for service data transmissions and coexistence operations 1500 are depicted in FIG. 15.

Without being scheduled for coexistence operations by the Service BS 1510, the Bridge CPE 1512 only maintains communications with the Service BS 1510 for service data transmissions 1520, 1522. Service connections 1516 are associated with service BS 1510 and Bridge CPE 1512. Coexistence connections 1518 are associated with Bridge CPE 1512 and Coexistence BS 1514. Any coexistence messages or scheduling 1532 transmitted from the Coexistence BS 1514 is ignored by the Bridge CPE 1512. When being scheduled for coexistence operations 1524 by the service BS, the Bridge CPE requests 1534 and establishes communications with the Coexistence BS for coexistence operations. The coexistence operations 1536, 1538 can be performed up to the Coexistence Operation Period 1526 scheduled by the service BS. After the Coexistence Operation Period expires, the Bridge CPE resumes communications 1528, 1530 with the service BS and terminates communications 1540 with the coexistence BS.

Figure 16:
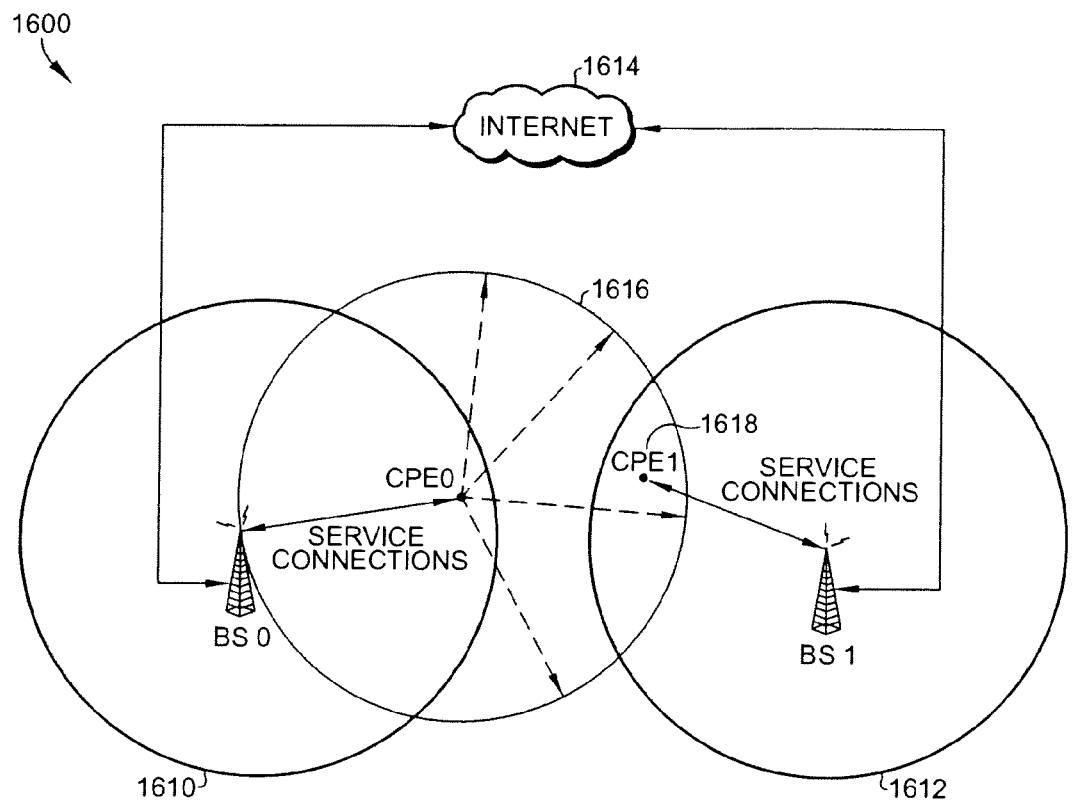
FIG. 16 shows an "over-the-backhaul" inter-system communications scenario.

Over-the-backhaul Logical Control Connections are now described. As described in the above section, when the coverage areas of multiple DYSPAN (WRAN) systems are overlapped, Over-the-air Logical Control Connections using Bridge CPEs can resolve the inter-system communications problems efficiently for coexistence. The inter-system communications, however, may not be able to be established and/or maintained using the Over-the-air Logical Control Connections in many cases, for which over-the-backhaul inter-system communications should be considered. FIG. 16 shows a scenario 1600 that favors over-the-backhaul inter-system communications instead of over-the-air LCC.

In this scenario, the coverage areas 1610 and 1612 of BS0 and BS1 are not overlapped, and Over-the-air LCC is not able to be established and maintained between BS0 1610 and BS1 1612, assuming a CPE (1616 or 1618) can only decode messages from base stations (1610 or 1612). These two DYSPAN (WRAN) systems (1610 and 1612), however, require coexisting with each other since, for example, CPE0 1616 associated with BS0 could interfere with CPE1 1618 associated with BS1 when they are operating on the same channel. BS0 and BS1 are connected through the internet 1614.

Figure 17:
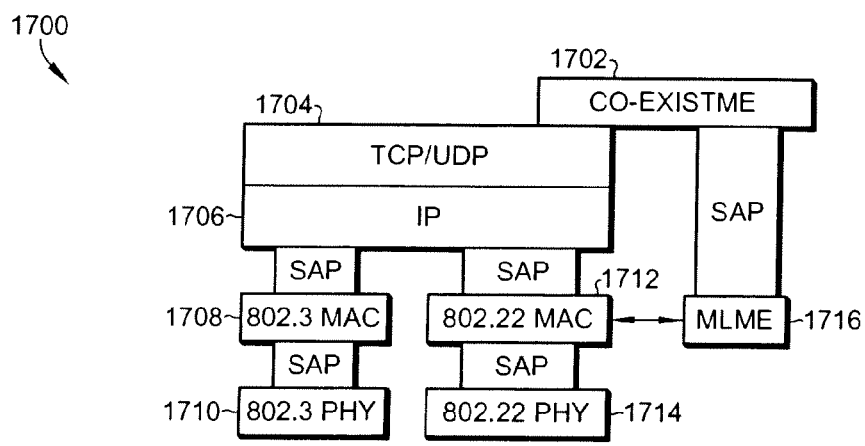
FIG. 17 shows a co-existence management entity in a protocol stack.

To facilitate the over-the-backhaul communications between DYSPAN (WRAN) base stations, a management entity called "Coexistence Management Entity" (CoexistME) 1702 is used, which is located on top of the TCP/UDP layer 1704 of each individual DYSPAN (WRAN) base station. A Coexistence Management Entity is used to manage message exchanges between the host DYSPAN (802.22 WRAN) MAC and a remote DYSPAN (802.22 WRAN) MAC. The CoexistME in the protocol stack 1700 is shown in FIG. 17. 802.22 MACs 1712 transmits or receives co-existence messages to or from another 802.22 MAC via the multi-layer management entity (MLME) 1716, CoExistME 1702, TCP/UDP 1704, IP 1706 layers and the 802.3 MAC 1708 and 802.3 PHY 1710 and 1714 layers.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

I claim:

1. A channel setup and maintenance method for a wireless system for providing negligible delay frequency switching comprising:
   selecting and maintaining a first cluster of channels that have passed a channel availability check;
   performing an initial channel setup for new channels in the first cluster of channels;
   performing cognitive dynamic frequency hopping among channels in a second cluster of channels for which channel setup has been performed successfully;
   performing periodic channel maintenance for the operation channel on which the wireless system is performing data transmissions; and
   providing collision avoidance for cognitive dynamic frequency hopping.

2. The method of claim 1 wherein channels in the first cluster for which channel setup has been performed successfully comprise channels in the second cluster.

3. The method of claim 1 wherein a channel that is not effectively maintained through regular channel maintenance comprises a new channel.

4. The method of claim 1 wherein the system schedules cognitive dynamic frequency hopping such that a maximum interval of periodic channel maintenance on every channel in the second cluster of channels is not exceeded.

5. The method of claim 4 wherein a channel comprises a well-maintained channel if the condition of having a maintenance interval less than the maximum allowed interval is satisfied.

6. The method of claim 4 wherein, if a channel is not well-maintained, the system eliminates that channel from the second cluster of channels.

7. The method of claim 1 further comprising channel move information embedded in management messages that are regularly transmitted from a base station to at least one customer device.

8. The method of claim 1 wherein a maximum maintenance interval is 30 to 35 seconds.

9. The method of claim 1 wherein providing collision avoidance for cognitive dynamic frequency hopping comprises:
   announcing a frequency hopping decision to all neighboring systems before hopping to a new channel;
   awaiting responses from the neighboring systems; and
   hopping to the new channel if no responses are received or selecting a different channel if a Dynamic Frequency Hopping announcement is received.

10. A wireless regional area network comprising a plurality of base stations and a plurality of customer devices having a channel setup and maintenance method for providing negligible delay frequency switching comprising:

selecting and maintaining a first cluster of channels that have passed a channel availability check;
performing an initial channel setup for new channels in the first cluster of channels;
performing cognitive dynamic frequency hopping among channels in a second cluster of channels for which channel setup has been performed successfully;
performing periodic channel maintenance for the operation channel on which the wireless network is performing data transmissions; and
providing collision avoidance for cognitive dynamic frequency hopping.

11. The method of claim 10 wherein channels in the first cluster for which channel setup has been performed successfully comprise channels in the second cluster.

12. The method of claim 10 wherein a channel that is not effectively maintained through regular channel maintenance comprises a new channel.

13. The network of claim 10 further comprising scheduling cognitive dynamic frequency hopping such that a maximum interval of periodic channel maintenance on every channel in the second cluster of channels is not exceeded.

14. The network of claim 13 wherein a channel comprises a well-maintained channel if the condition of having a maintenance interval less than the maximum allowed interval is satisfied.

15. The network of claim 14 wherein, if a channel is not well-maintained, the network eliminates that channel from the second cluster of channels.

16. The network of claim 10 further comprising channel move information embedded in management messages that are regularly transmitted from a base station to at least one customer device.

17. The network of claim 10 wherein a maximum maintenance interval is 30 to 35 seconds.

18. The method of claim 10 wherein providing collision avoidance for cognitive dynamic frequency hopping comprises:
announcing a frequency hopping decision to all neighboring systems before hopping to a new channel;
awaiting responses from the neighboring systems; and
hopping to the new channel if no responses are received or selecting a different channel if a Dynamic Frequency Hopping announcement is received.

19. A maintenance method for a wireless network comprising combining periodic channel maintenance with cognitive dynamic frequency hopping over a cluster of vacated channels that are initially setup so that the channel set up delay for channel switching is substantially reduced and providing collision avoidance for cognitive dynamic frequency hopping.

20. The method of claim 19 further comprising selecting and maintaining a first cluster of channels that have passed a channel availability check.

21. The method of claim 20 further comprising performing an initial channel setup for new channels in the first cluster of channels.

22. The method of claim 21 further comprising performing cognitive dynamic frequency hopping among channels in a second cluster of channels for which channel setup has been performed successfully.

23. The method of claim 22 further comprising performing periodic channel maintenance for the operation channel on which the wireless network is performing data transmissions.

24. The method of claim 22 wherein the network schedules cognitive dynamic frequency hopping such that a maximum interval of periodic channel maintenance on every channel in the second cluster of channels is not exceeded.

25. The method of claim 24 wherein a channel comprises a well-maintained channel if the condition of having a maintenance interval less than the maximum allowed interval is satisfied and, if a channel is not well-maintained, the network eliminates that channel from the second cluster of channels.

26. The method of claim 24 wherein the maximum maintenance interval is 30 to 35 seconds.

27. The method of claim 19 wherein channels in the first cluster for which channel setup has been performed successfully comprise channels in the second cluster.

28. The method of claim 19 wherein a channel that is not effectively maintained through regular channel maintenance comprises a new channel.

29. The method of claim 19 wherein providing collision avoidance for cognitive dynamic frequency hopping comprises:
announcing a frequency hopping decision to all neighboring systems before hopping to a new channel;
awaiting responses from the neighboring systems; and
hopping to the new channel if no responses are received or selecting a different channel if a Dynamic Frequency Hopping announcement is received.

* * * * *